United States Patent
Chino et al.

(10) Patent No.: US 7,465,344 B2
(45) Date of Patent: *Dec. 16, 2008

(54) INK FOR INK JET RECORDING COMPRISING PRINT DENSITY IMPROVER, PRINT DENSITY IMPROVER AND METHOD FOR IMPROVING PRINT DENSITY

(75) Inventors: Tomohiro Chino, Nagoya (JP); Takashi Ozawa, Odawara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 227 days.

This patent is subject to a terminal disclaimer.

(21) Appl. No.: 11/392,487

(22) Filed: Mar. 30, 2006

(65) Prior Publication Data

US 2006/0272544 A1   Dec. 7, 2006

(30) Foreign Application Priority Data

Mar. 31, 2005   (JP)   ............... P. 2005-102572
Oct. 13, 2005   (JP)   ............... P. 2005-298994

(51) Int. Cl.
   *C09D 11/00*   (2006.01)
   *C09D 11/02*   (2006.01)

(52) U.S. Cl. ............ 106/31.27; 106/31.49; 106/31.51; 106/31.52; 106/31.48; 106/31.5; 106/31.46

(58) Field of Classification Search ............ 106/31.27, 106/31.49, 31.51, 31.52, 31.48, 31.5, 31.46
See application file for complete search history.

(56) References Cited

U.S. PATENT DOCUMENTS

| | | | |
|---|---|---|---|
| 3,873,295 A | | 3/1975 | Bates et al. |
| 4,259,675 A | * | 3/1981 | Mansukhani ............ 106/31.58 |
| 5,554,213 A | * | 9/1996 | Radigan et al. .......... 106/31.43 |
| 6,231,653 B1 | * | 5/2001 | Lavery et al. ............ 106/31.58 |
| 6,319,309 B1 | * | 11/2001 | Lavery et al. ............ 106/31.27 |
| 6,533,851 B2 | * | 3/2003 | Lee et al. ................ 106/31.27 |
| 7,192,475 B2 | * | 3/2007 | Takasaki et al. ............ 106/31.5 |
| 7,208,034 B2 | * | 4/2007 | Ozawa .................... 106/31.49 |
| 2006/0016368 A1 | * | 1/2006 | Ozawa et al. ............ 106/31.27 |

FOREIGN PATENT DOCUMENTS

| | | |
|---|---|---|
| JP | 4-339876 | 11/1992 |
| JP | 2002-317136 | 10/2002 |
| JP | 2003-147245 | 5/2003 |
| JP | 3487010 | 10/2003 |
| JP | 2004-59755 | 2/2004 |
| JP | 2004-123904 | 4/2004 |

OTHER PUBLICATIONS

English translation of JP 2004/059755; Feb. 2004.*

* cited by examiner

*Primary Examiner*—Helene Klemanski
(74) *Attorney, Agent, or Firm*—Buchanan Ingersoll & Rooney PC

(57) ABSTRACT

An aqueous ink for ink jet recording, which comprises: at least one dye; and at least one of a compound having at least one phosphonic acid group and at least one carboxyl group and a compound having at least two phosphonic acid groups as a print density improver(s), a print density improver, and a method for enhancing print density involving the use of the aforementioned print density improver.

9 Claims, No Drawings

INK FOR INK JET RECORDING COMPRISING PRINT DENSITY IMPROVER, PRINT DENSITY IMPROVER AND METHOD FOR IMPROVING PRINT DENSITY

BACKGROUND OF THE INVENTION

1. Field of the Invention

The present invention relates to an ink for ink jet recording comprising as an additive or print density improver a compound which has a specific structure to exert an excellent effect of improving print density or like properties. More particularly, the present invention relates to the print density improver for ink for ink jet recording and a method for improving the print density in ink jet recording involving the use of the print density improver.

2. Description of the Related Art

Ink jet recording method has been rapidly spread and further developed because it requires a reduced material cost, allows a high speed recording, causes little noise during recording and allows easy color recording.

Examples of ink jet recording method include a continuous method involving continuous ejection of droplets and an on-demand method involving ejection of droplets according to an image data signal. Examples of ejection method include a method which allows a piezoelectric element to give pressure that causes a droplet to be ejected, a method which comprises heating the ink to generate bubbles causing a droplet to be ejected, a method involving the use of ultrasonic wave, and a method which uses electrostatic force to suck and discharge a droplet. As inks for these ink jet recording methods there are used aqueous inks, oil-based inks and solid (melt type) inks.

The dyes to be incorporated in these inks for ink jet recording are required to exhibit a high solubility in solvents, allow a high density recording and have a good hue and an excellent fastness to light, heat, active gas in the atmosphere (e.g., oxidizing gas such as NOx and ozone, SOx), water and chemical, a good fixability to image-receiving materials, difficulty in bleeding, a high print density on image-receiving materials, an excellent preservability, no toxicity and a high purity and be available at a low cost. However, it is extremely difficult to meet all these requirements only the properties of dyes.

Under these circumstances, the inventors considered to try to meet the aforementioned demands on ink for ink jet recording by incorporating compounds other than dye in the ink so that the insufficiency in the properties of the dye can be made up for. In some detail, the inventors considered to try to improve print density, light-fastness and ozone resistance by incorporating specific compounds in the ink. In particular, in the case where association is utilized to raise the fastness of dye, the resulting print tends to have a lowered density. In this case, the print density improver of the invention is effective. JP-A-4-339876 discloses that the combined use of an organic amine salt of dicarboxylic acid and a dicarboxylic acid makes it possible to raise the print density on a high quality paper. However, when a dicarboxylic acid is additionally used, the resulting ink has a lowered pH value (acidic) and thus becomes impractical. Further, the dicarboxylic acids (e.g., maleic acid, malic acid) disclosed in JP-A-4-339876 above exert a low effect of enhancing print density according to the inventors' evaluation. JP-A-2003-147245 discloses that the use of an ink composition for ink jet recording comprising an organic phosphonic acid makes it possible to prevent head clogging but makes no reference to print density and fastness in the examples. Japanese Patent No. 3487010 discloses an ink for ink jet recording comprising a compound having a heterocyclic ring and a carboxyl group incorporated therein, but the compound disclosed has only one carboxylic acid group and thus can exert a low effect according to the inventors' evaluation. JP-A-2004-123904 discloses an aqueous ink comprising various chelating agents, but these chelating agents have an effect only on calcium and magnesium. JP-A-2002-317136 and JP-A-2004-59755 disclose an ink for ink jet recording comprising a specific organic phosphonic acid, but this organic phosphonic acid has an effect of preventing scorching. These references make no reference to enhancement of print density.

SUMMARY OF THE INVENTION

An aim of the invention is to provide an aqueous ink for ink jet recording capable of giving a colored image having a high print density and an excellent fastness.

The inventors made extensive studies of an aqueous ink which exhibits a high print density, a good hue and a high fastness to light and ozone. As a result, it was found that the aforementioned aim can be accomplished by associating dyes to raise fastness and by adding specific additives to raise print density.

In other words, the invention provides an ink for ink jet recording, a print density improver and a method for improving print density having the following constitution to accomplish the aforementioned aim.

(1) An aqueous ink for ink jet recording, which comprises:

at least one dye; and at least one of a compound having at least one phosphonic acid group and at least one carboxyl group and a compound having at least two phosphonic acid groups as a print density improver(s).

(2) The ink for ink jet recording as described in (1) above, wherein the at least one of a compound having at least one phosphonic acid group and at least one carboxyl group and a compound having at least two phosphonic acid groups is a compound represented by formula (1):

$$Y_m\text{-}Z\text{-}(PO_3X_2)_n \quad (1)$$

wherein Z represents a connecting group which may be substituted;

Y represents —$CO_2X$, —$SO_3X$ or other anionic hydrophilic substituent;

X represents a hydrogen atom, an alkaline metal, an alkaline earth metal or a substituted or unsubstituted ammonium cation;

m represents an integer of 0 or more; and n represents an integer of 1 or more when m is 1 or more and Y contains —$SO_3X$, and n represents an integer of 2 or more when m is 0 or when m is 1 or more but Y is free of —$SO_3X$, with the proviso that there are a plurality of X's and Y's, they may be the same or different.

(3) The ink for ink jet recording as described in (2) above, wherein X in the compound represented by formula (1) is lithium.

(4) The ink for ink jet recording as described in any of (1) to (3) above, wherein the at least one dye comprises at least one selected from the group consisting of phthalocyanine dye, monoazo dye, disazo dye, trisazo dye and tetrakisazo dye.

(5) The ink for ink jet recording as described in (4) above, wherein the disazo dye is represented by formula (2):

$$A\text{-}N\text{=}N\text{-}B\text{-}N\text{=}N\text{-}C \quad (2)$$

wherein A, B and C each independently represents an aromatic or heterocyclic group which may be substituted, with the proviso that A and C each represents a monovalent group and B represents a divalent group.

(6) The ink for ink jet recording as described in (5) above, wherein the disazo dye is represented by formula (3):

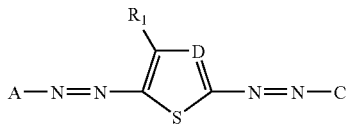

Formula (3)

wherein A and C each independently represents an aromatic or heterocyclic group which may be substituted;

$R^1$ represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be further substituted; and D represents a nitrogen atom or —C(CN)=.

(7) The ink for ink jet recording as described in (6) above, wherein the disazo dye is represented by formula (4):

D represents a nitrogen atom or —C(CN)=;

X represents a hydrogen atom, alkaline metal, alkaline earth metal or substituted or unsubstituted ammonium cation; and n represents an integer of from 0 to 3.

(8) The ink for ink jet recording as described in (5) above, wherein the disazo dye is represented by formula (6):

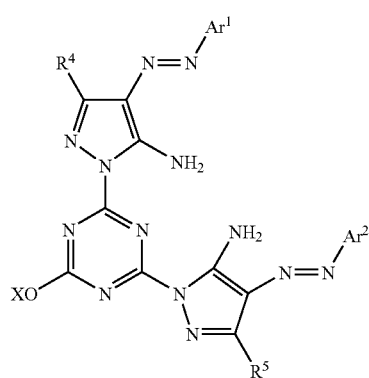

Formula (6)

In the formula (6), $R^4$ and $R^5$ each independently represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group,

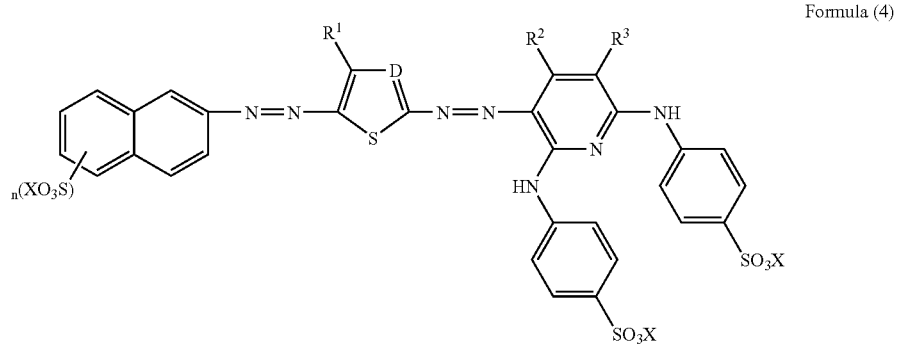

Formula (4)

wherein $R^1$, $R^2$ and $R^3$ each independently represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group; alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be further substituted;

aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be substituted. $Ar^1$ and $Ar^2$ each independently represents an aromatic or heterocyclic group which may be substituted. The heterocyclic group is preferably a 5-membered or 6-membered which may be further condensed. The heterocyclic group may be also an aromatic heterocyclic group or a nonaromatic heterocyclic group. Examples of the heterocyclic group include pyridine, pyrazine, pyridazine, quinoline, isoquinoline, quinazoline, cinnoline, phthalazine, quinoxaline, pyrrole, indole, furane, benzofurane, thiophene, benzothiophene, pyrazole, imidazole, benzimidazole, triazole, oxazole, benzoxazole, thiazole, benzothiazole, isothiazole, benzisothiazole, thiadiazole, isooxazole, benzisooxazole, pyrrolidine, piperidine, piperadine, imidazolidine, and thiazoline. Preferred among these heterocyclic groups are aromatic heterocyclic groups. Preferred examples of aromatic heterocyclic groups include pyridine, pyrazine, pyridazine, pyrazole, imidazole, benzimidazole, triazole, benzoxazole, thiazole, benzothiazole, isothiazole, benzisothiazole, and thiadiazole. Preferred among these aromatic heterocyclic groups are pyrazole and thiadiazole (preferably 1,3,4-thiadiazole, 1,2,4-thiadiazole) These aromatic heterocyclic groups may have substituents. Examples of these substituents are the same as those listed below with reference to aromatic groups. Examples of the aromatic groups include substituted or unsubstituted aromatic groups, preferably having from 6 to 30 carbon atoms. Examples of the substituents on the aromatic groups include halogen atoms, alkyl groups, cycloalkyl groups, aralkyl groups, alkenyl groups, alkinyl groups, aryl groups, heterocyclic groups, cyano groups, hydroxyl groups, nitro groups, carboxyl groups (optionally in the form of salt), alkoxy groups, aryloxy groups, silyloxy groups, heterocyclic oxy groups, acyloxy groups, carbamoyloxy groups, alkoxycarbonyloxy groups, aryloxycarbonyloxy groups, amino groups (containing anilino group), acylamino groups, aminocarbonylamino groups, alkoxycarbonylamino groups, aryloxycarbonylamino groups, sulfamoylamino groups, alkylsulfonylamino groups, arylsulfonylamino groups, mercapto groups, alkylthio groups, arylthio groups, heterocyclic thio groups, sulfamoyl groups, sulfo groups (optionally in the form of salt), alkylsulfinyl groups, arylsulfinyl groups, alkylsulfonyl groups, arylsulfonyl groups, acyl groups, aryloxycarbonyl groups, alkoxycarbonyl groups, carbamoyl groups, imido groups, phosphino groups, phosphinyl groups, phosphinyloxy groups, phosphinylamino groups, and silyl groups. The aromatic group represented by $Ar^1$ or $Ar^2$ is more preferably a substituted phenyl group (The substituent is preferably a carboxyl group or sulfo group). X is as defined in (2) above.

(9) The ink for ink jet recording as described in (4) above, wherein the monoazo dye is represented by formula (7):

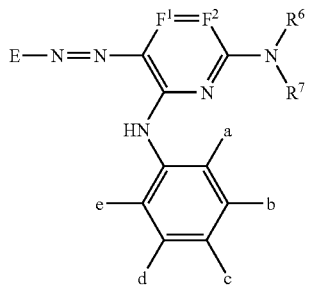

Formula (7)

In the formula (7), E represents an aromatic or heterocyclic group which may be substituted. $F^1$ and $F^2$ each represents $-CR^8=$ or $-CR^9=$. Alternatively, one of $F^1$ and $F^2$ represents a nitrogen atom and the other represents $-CR^8=$ or $-CR^9=$. $R^6$ and $R^7$ each independently represents a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. These groups may have substituents. $R^8$ and $R^9$ each independently represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be substituted. $R^6$ and $R^7$ or $R^6$ and $R^9$ may be connected to each other to form a 5-membered or 6-membered ring. The symbols a and e each independently represents an alkyl group, alkoxy group or halogen atom. When the symbols a and e are an alkyl group at the same time, the total number of carbon atoms constituting the alkyl group is 3 or more. These alkyl groups may be further substituted. The symbols b, c and d each have the same meaning as $R^8$ and $R^9$. The symbols a and b or e and d may be condensed to each other. However, the compound of the formula (7) has substituents at least one of which provides solubility (ionic hydrophilic group in the case where the dye is water-soluble or hydrophobic group in the case where the dye is oil-soluble).

(10) The ink for ink jet recording as described in (4) above, wherein the phthalocyanine dye is represented by formula (5):

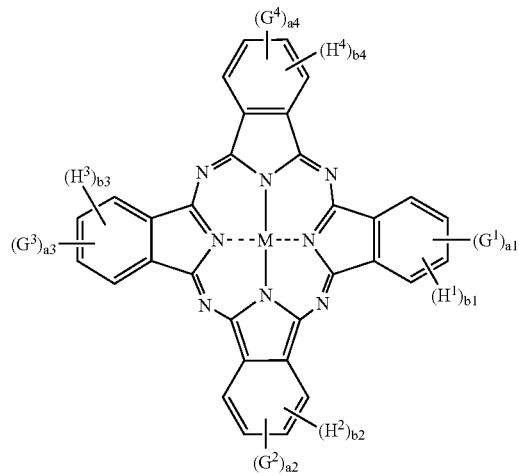

Formula (5)

wherein $G^1$, $G^2$, $G^3$ and $G^4$ each independently represents a $-SO-R^{10}$, $-SO_2-R^{10}$, $-SO_2NR^{11}R^{12}$, sulfo group, $-CONR^{11}R^{12}$ or $-CO_2R^{11}$ in which $R^{10}$ represents a substituted or unsubstituted alkyl, cycloalkyl, alkenyl, aralkyl, aryl or heterocyclic group, and $R^{11}$ and $R^{12}$ each independently represents a hydrogen atom or substituted or unsubstituted alkyl, cycloalkyl, alkenyl, aralkyl, aryl or heterocyclic group, with the proviso that there are a plurality of $R^{10}$'s, they may be the same or different;

$H^1$, $H^2$, $H^3$ and $H^4$ each independently represents a monovalent substituent;

$a_1$ to $a_4$ and $b_1$ to $b_4$ each independently represents the number of substituents $G^1$ to $G^4$ and $H^1$ to $H^4$, respectively;

$a_1$ to $a_4$ each independently represents an integer of from 0 to 4, with the proviso that $a_1$ to $a_4$ are not 0 at the same time;

$b_1$ to $b_4$ each independently represents an integer of from 0 to 4, with the proviso that when $a_1$ to $a_4$ and $b_1$ to $b_4$ each represents an integer of 2 or more, the plurality of $G^1$'s to $G^4$'s and $H^1$'s to $H^4$'s may be the same or different; and M represents a hydrogen atom, metal atom or oxide, hydroxide or halide thereof.

(11) The ink for ink jet recording as described in any of (1) to (10) above, wherein the at least one dye has either or both of physical properties 1 and 2:

Physical property 1: $|\lambda\text{max }(DMF)-\lambda\text{max (water)}| \geqq 30$ nm Physical property 2: $\epsilon(DMF) \geqq \epsilon(\text{water})$ wherein λmax (DMF) represents a maximum absorption wavelength in absorption spectrum measured in DMF;

λmax (water) represents a maximum absorption wavelength in absorption spectrum measured in water;

ε (DMF) represents a molar absorption coefficient in DMF; and

ε (water) represents a molar absorption coefficient in water.

(12) A print density improver for an ink for ink jet recording, which comprises at least one of a compound having at least one phosphonic acid group and at least one carboxyl group and a compound having at least two phosphonic acid groups.

(13) The print density improver as described in (12) above, wherein the at least one of a compound having at least one phosphonic acid group and at least one carboxyl group and the compound having at least two phosphonic acid groups is a compound represented by formula (1):

$$Y_m\text{-}Z\text{-}(PO_3X_2)_n \quad (1)$$

wherein Z represents a connecting group which may be substituted;

Y represents —$CO_2X$, —$SO_3X$ or other anionic hydrophilic substituent;

X represents a hydrogen atom, an alkaline metal, an alkaline earth metal or a substituted or unsubstituted ammonium cation;

m represents an integer of 0 or more; and n represents an integer of 1 or more when m is 1 or more and Y contains —$SO_3X$, and n represents an integer of 2 or more when m is 0 or when m is 1 or more but Y is free of —$SO_3X$, with the proviso that there are a plurality of X's and Y's, they may be the same or different.

(14) The print density improver as described in (13) above, wherein X in the compound represented by formula (1) is lithium.

(15) A method for improving print density in ink jet recording, which comprises utilizing a print density improver as described in any of (12) to (14) above.

DETAILED DESCRIPTION OF THE INVENTION

The invention will be further described hereinafter.

[Ink for Ink Jet Recording]

The ink for ink jet recording of the invention will be described hereinafter.

An ink for ink jet recording can be prepared by dissolving and/or dispersing a dye in a lipophilic medium or aqueous medium. The ink for ink jet recording of the invention is an aqueous ink having a dye incorporated in an aqueous medium. The ink for ink jet recording of the invention further comprises an additive incorporated therein having an excellent effect of enhancing print density or like properties.

[Inventive Additive: Print Density Improver]

Firstly, the additive which exhibits an excellent effect of enhancing print density or like properties when incorporated in the ink for ink jet recording of the invention (hereinafter occasionally referred to as "inventive additive", "inventive print density improver" or simply to as "print density improver") will be described.

The inventive additive is a compound having a phosphonic acid group or carboxylic acid group, particularly a compound having at least two phosphonic acid groups or a compound having at least one phosphonic acid group and at least one carboxyl group. The more the number of phosphonic acid groups and carboxyl acid groups is, the higher is the resulting effect. Further, the compound having both a phosphonic acid group and a carboxylic acid group exerts a higher effect. These compounds may be used solely or combined with each other. The counter cation of these compounds is not limited. Examples of the counter cation include lithium and sodium. Lithium is most desirable from the standpoint of enhancement of print density.

The ink for ink jet recording of the invention exerts an effect of enhancing print density, an effect of improving light-resistance and an effect of ozone resistance. The ink for ink jet recording containing the additive of the invention exerts a remarkable effect of enhancing print density among these effects. Thus, the inventive additive can be called a print density improver.

The mechanism by which the inventive additive enhances print density is unknown. However, it is presumed that the inventive additive enhances the penetrating power of the ink to enhance print density.

Preferred examples of the compound to be used as print density improver of the invention will be given below, the compound to be used as print density improver of the invention is not limited thereto.

(i) Compound having phosphonic acid group (—$PO_3H_2$) and carboxyl group (—$CO_2H$)

A-1
$$HO-\underset{\underset{OH}{|}}{\overset{\overset{O}{\|}}{P}}-\underset{H_2}{C}-\overset{\overset{O}{\|}}{C}-OH$$

A-2
$$HO-\underset{\underset{OH}{|}}{\overset{\overset{O}{\|}}{P}}-\underset{H_2}{C}-\underset{H_2}{C}-\overset{\overset{O}{\|}}{C}-OH$$

A-3
$$HO-\underset{\underset{OH}{|}}{\overset{\overset{O}{\|}}{P}}-\underset{H_2}{C}-\underset{H_2}{C}-\underset{H_2}{C}-\overset{\overset{O}{\|}}{C}-OH$$

A-4
$$HO-\underset{\underset{OH}{|}}{\overset{\overset{O}{\|}}{P}}-\underset{\underset{OH}{|}}{\overset{H}{C}}-\overset{\overset{O}{\|}}{C}-OH$$

-continued

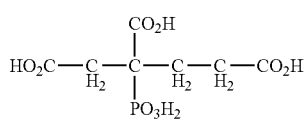
A-5

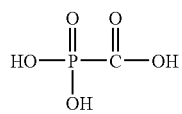
A-6

(ii) Compound having two or more phosphonic acid groups (—PO$_3$H$_2$)

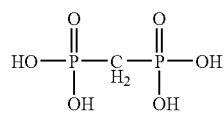
B-1

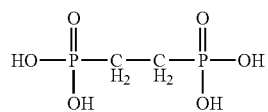
B-2

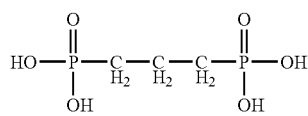
B-3

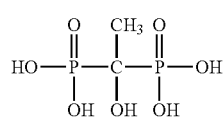
B-4

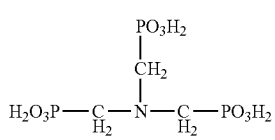
B-5

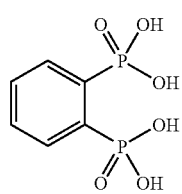
B-6

It is preferred from the standpoint of enhancement of print density improver that 100 parts by weight of the ink for ink jet recording contain from 0.1 to 10 parts by weight of the print density improver of the invention. The print density improver of the invention is more preferably incorporated in the ink for ink jet recording in an amount of from not smaller than 0.5 to not greater than 5 parts by weight, even more preferably from not smaller than 1 to not greater than 3 parts by weight.

[Dye]

The dye which can be used in the invention will be described hereinafter. In the invention, any dye may be used so far as it can be incorporated in an aqueous ink for ink jet recording. In particular, a dye selected from the group consisting of phthalocyanine dye, anthrapyridone dye, metal chelate dye, monoazo dye, disazo dye, triazo dye and tetrakisazo dye can easily form an associated state. Since a dye which can be easily associated shows a remarkable drop of print density, such a dye is preferably used in combination with the inventive additive. Further, since the disazo dye, trisazo dye or phthalocyanine dye forms an associated material to drastically enhance fastness, it is preferably used in combination with the print density improver of the invention from the standpoint of compensation for deterioration of print density.

(Disazo Dye)

As a disazo dye, one represented by the following formula (2) is particularly preferred from the standpoint of fastness.

$$A\text{-}N{=}N\text{—}B\text{—}N{=}N\text{—}C \qquad (2)$$

wherein A, B and C each independently represent an aromatic or heterocyclic group which may be substituted. (A and C represents a monovalent group and B represents a divalent group.)

Preferred among these compounds is one represented by the following formula (3).

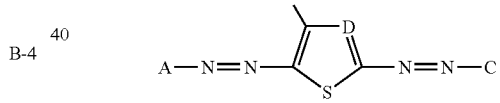

Formula (3)

In the formula (3), A and C each independently represent an aromatic or heterocyclic group which may be substituted. R$^1$ represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be further substituted; and D represents a nitrogen atom or —C(CN)=.

Particularly preferred among the disazo dyes represented by the formula (3) is one represented by the following formula (4).

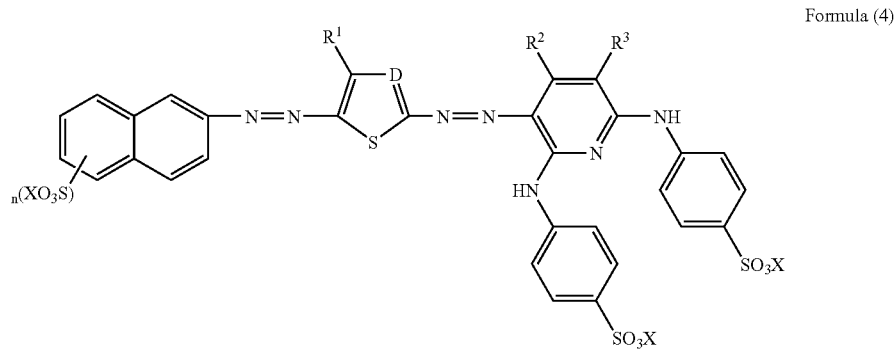

Formula (4)

wherein $R^1$, $R^2$ and $R^3$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be further substituted; D represents a nitrogen atom or —C(CN)=, X represents a hydrogen atom, alkaline metal, alkaline earth metal or substituted or unsubstituted ammonium cation, and n represents an integer of from 0 to 3.

As the disazo dye, one represented by the following formula (6), too, is preferred.

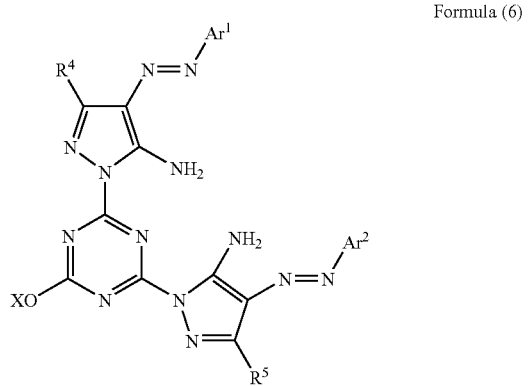

Formula (6)

In the formula (6), $R^4$ and $R^5$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be substituted. $Ar^1$ and $Ar^2$ each independently represent an aromatic or heterocyclic group which may be substituted. The heterocyclic group is preferably a 5-membered or 6-membered which may be further condensed. The heterocyclic group may be also an aromatic heterocyclic group or a nonaromatic heterocyclic group. Examples of the heterocyclic group include pyridine, pyrazine, pyridazine, quinoline, isoquinoline, quinazoline, cinnoline, phthalazine, quinoxaline, pyrrole, indole, furane, benzofurane, thiophene, benzothiophene, pyrazole, imidazole, benzimidazole, triazole, oxazole, benzoxazole, thiazole, benzothiazole, isothiazole, benzisothiazole, thiadiazole, isooxazole, benzisooxazole, pyrrolidine, piperidine, piperadine, imidazolidine, and thiazoline. Preferred among these heterocyclic groups are aromatic heterocyclic groups. Preferred examples of aromatic heterocyclic groups include pyridine, pyrazine, pyridazine, pyrazole, imidazole, benzimidazole, triazole, benzoxazole, thiazole, benzothiazole, isothiazole, benzisothiazole, and thiadiazole. Preferred among these aromatic heterocyclic groups are pyrazole and thiadiazole (preferably 1,3,4-thiadiazole, 1,2,4-thiadiazole). These aromatic heterocyclic groups may have substituents. Examples of these substituents are the same as those listed below with reference to aromatic groups. Examples of the aromatic groups include substituted or unsubstituted aromatic groups, preferably having from 6 to 30 carbon atoms. Examples of the substituents on the aromatic groups include halogen atoms, alkyl groups, cycloalkyl groups, aralkyl groups, alkenyl groups, alkinyl groups, aryl groups, heterocyclic groups, cyano groups, hydroxyl groups, nitro groups, carboxyl groups (optionally in the form of salt), alkoxy groups, aryloxy groups, silyloxy groups, heterocyclic oxy groups, acyloxy groups, carbamoyloxy groups, alkoxycarbonyloxy groups, aryloxycarbonyloxy groups, amino groups (containing anilino group), acylamino groups, aminocarbonylamino groups, alkoxycarbonylamino groups, aryloxycarbonylamino groups, sulfamoylamino groups, alkylsulfonylamino groups, arylsulfonylamino groups, mercapto groups, alkylthio groups, arylthio groups, heterocyclic thio groups, sulfamoyl groups, sulfo groups (optionally in the form of salt), alkylsulfinyl groups, arylsulfinyl groups, alkylsulfonyl groups, arylsulfonyl groups, acyl groups, aryloxycarbonyl groups, alkoxycarbonyl groups, carbamoyl groups, imido groups, phosphino groups, phosphinyl groups, phosphinyloxy groups, phosphinylamino groups, and silyl groups. The aromatic group represented by $Ar^1$ or $Ar^2$ is more preferably a substituted phenyl group (The substituent is preferably a carboxyl group or sulfo group). X represents a hydrogen atom, an alkaline metal, an alkaline earth metal or a substituted or unsubstituted ammonium cation.

Specific examples of the dye compound which is preferably used in the invention will be given below, but the invention to be used in the invention is not limited thereto.

Among the dyes of the formula (2), those having A, B and C in the following combination are preferred.

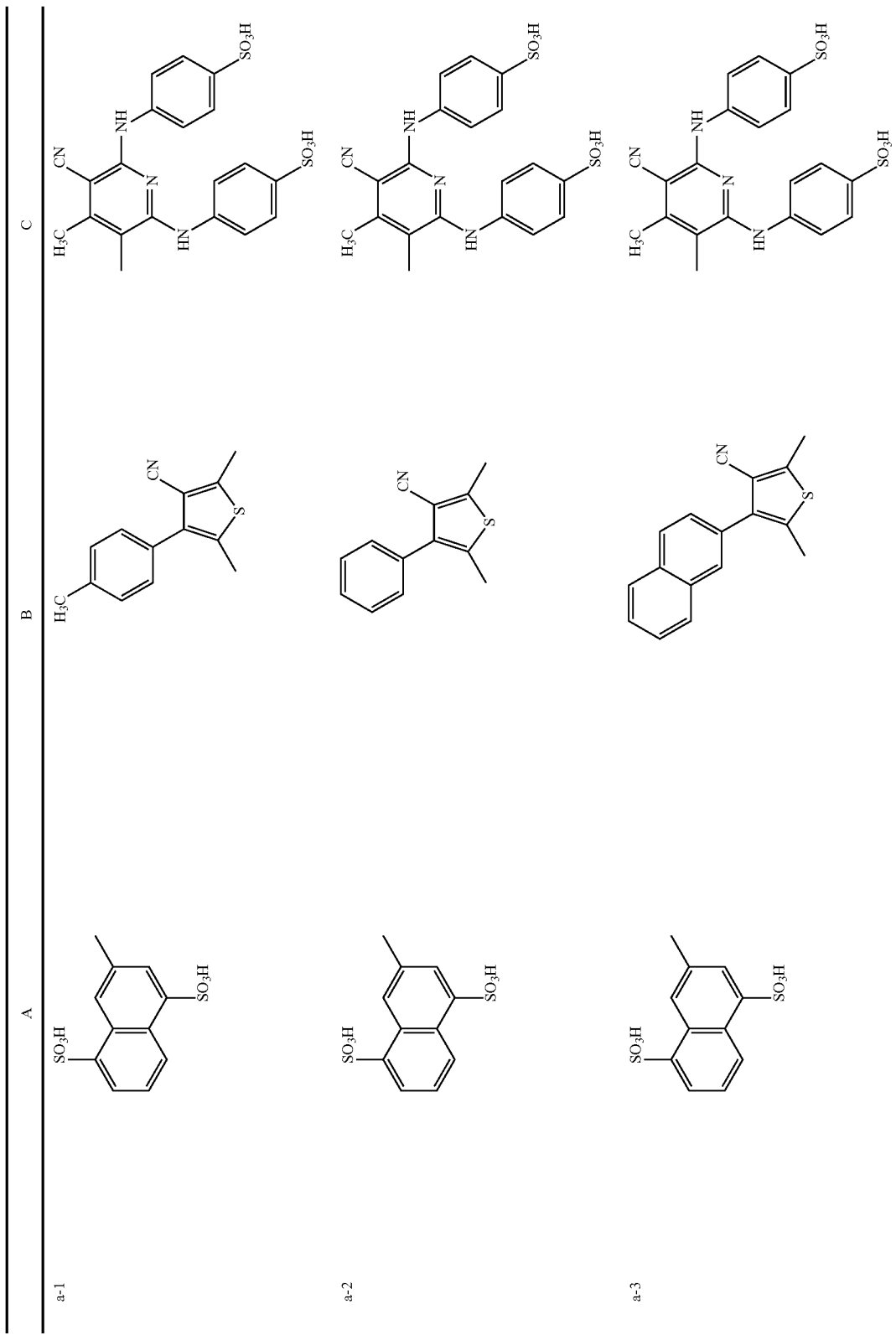

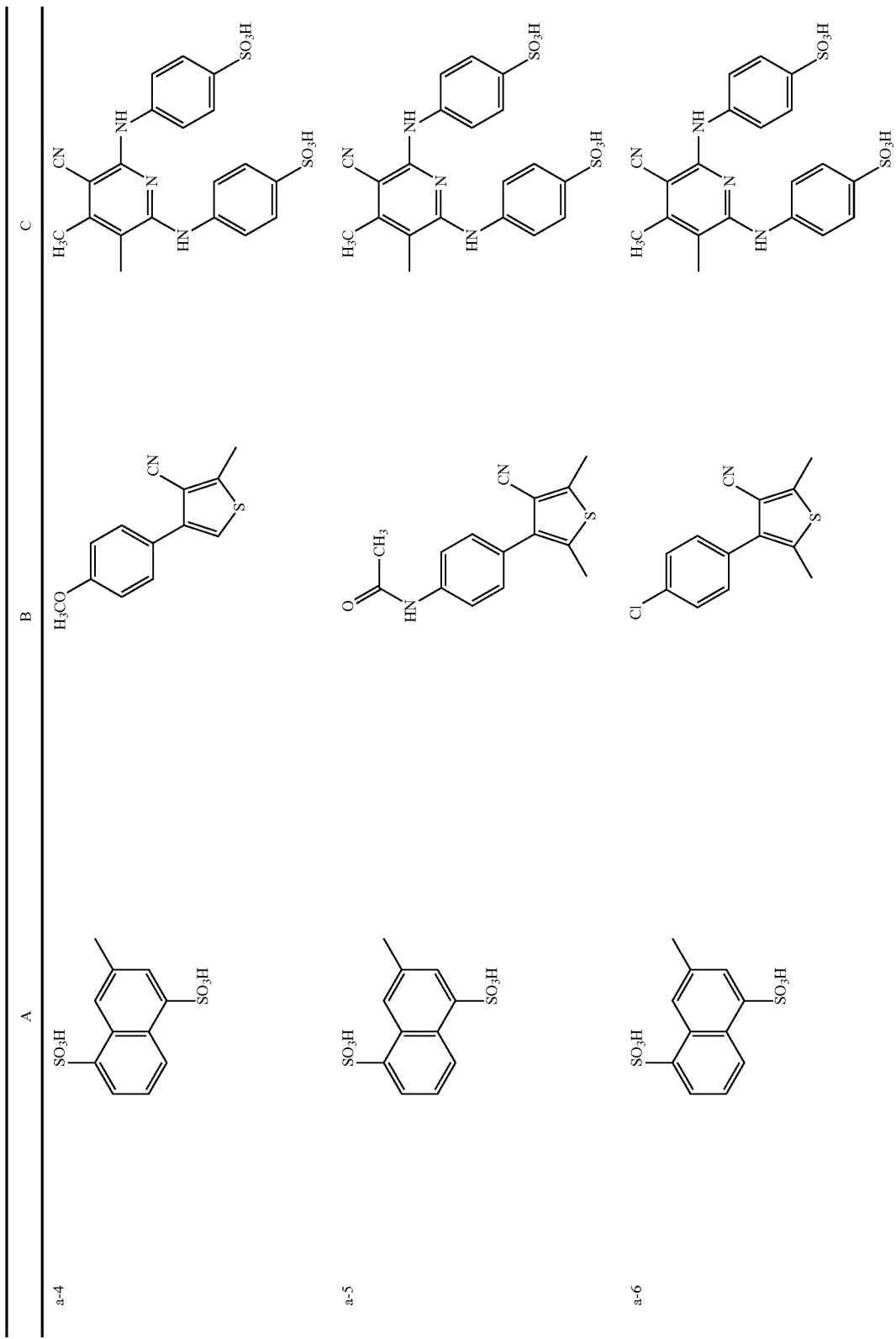

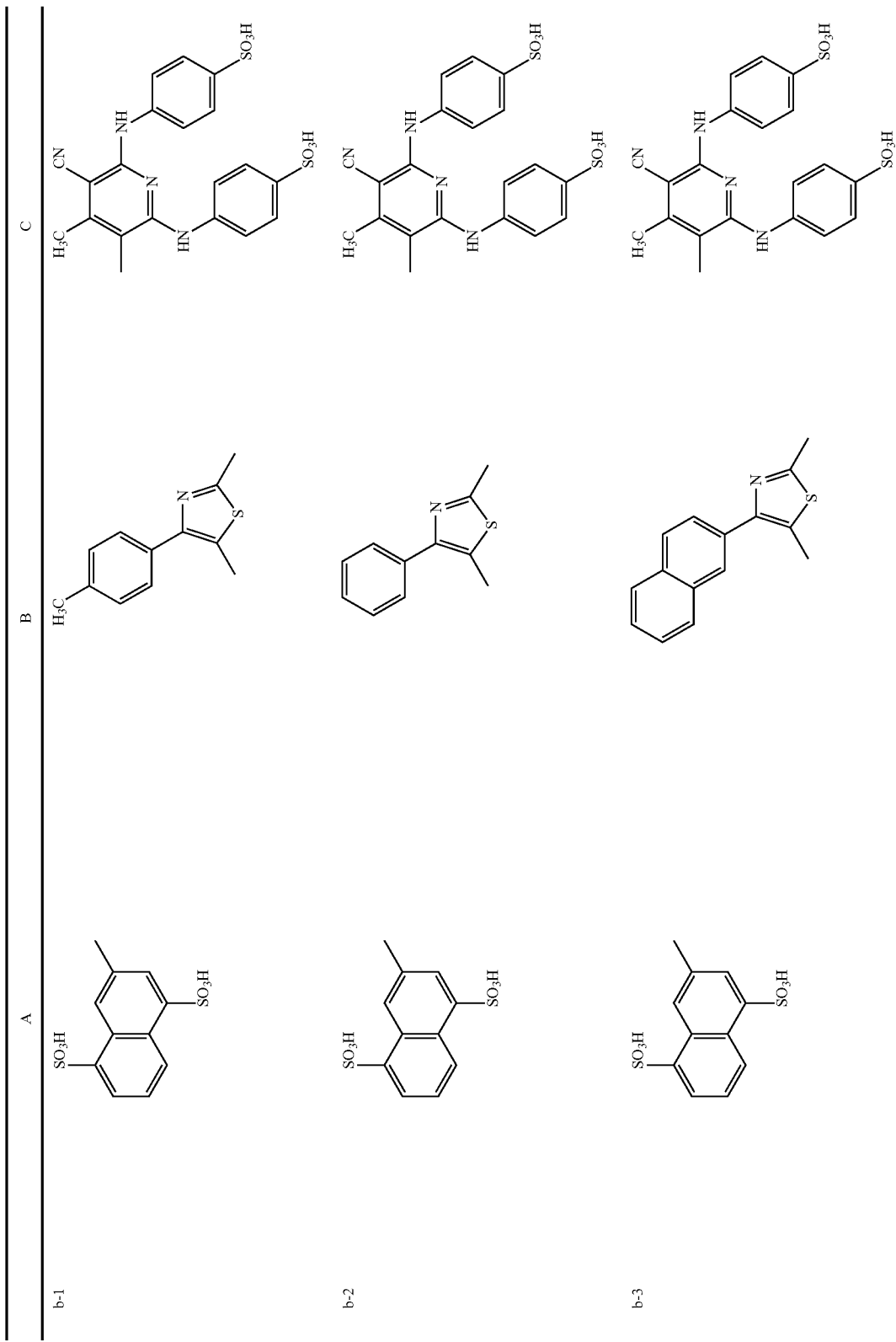

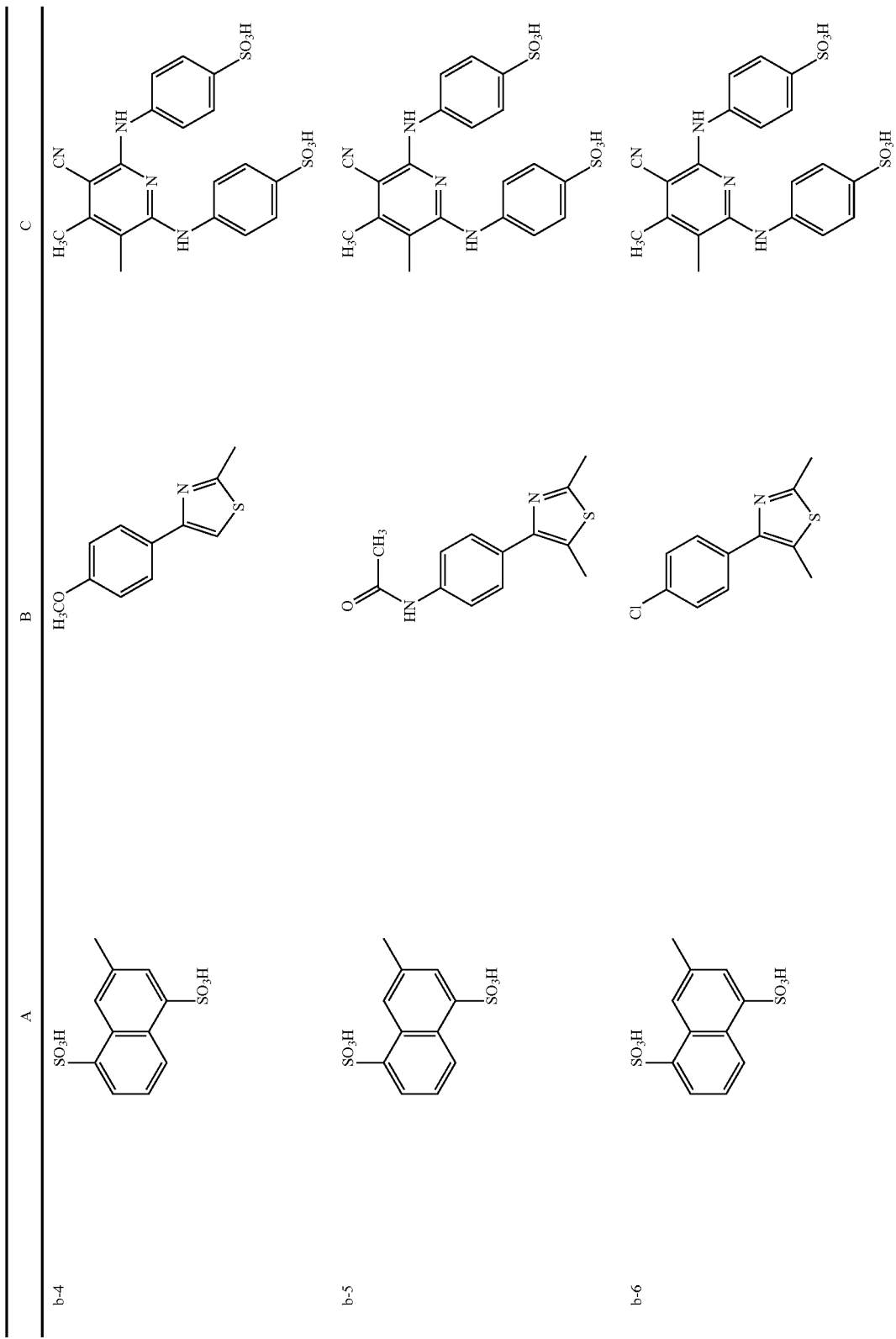

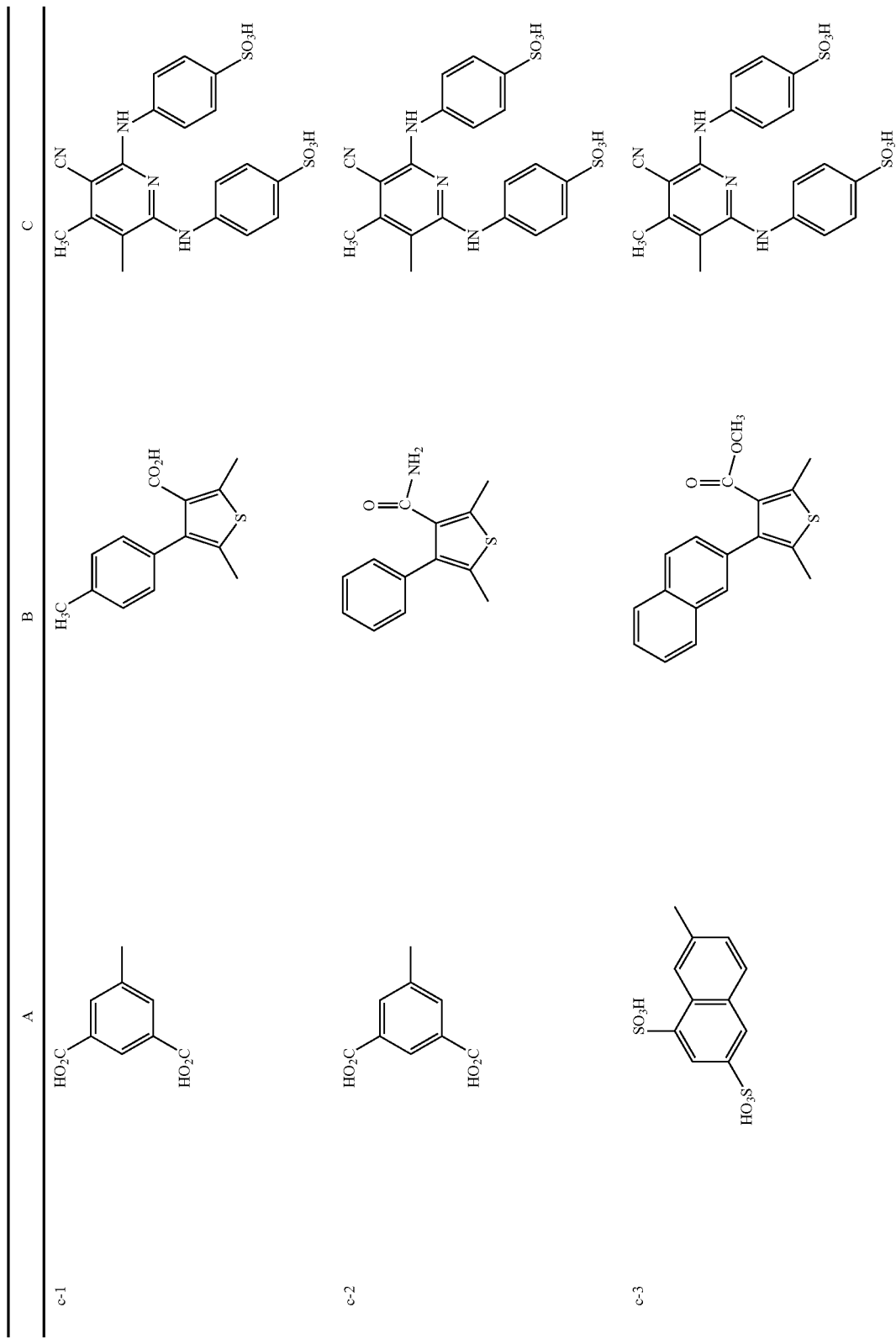

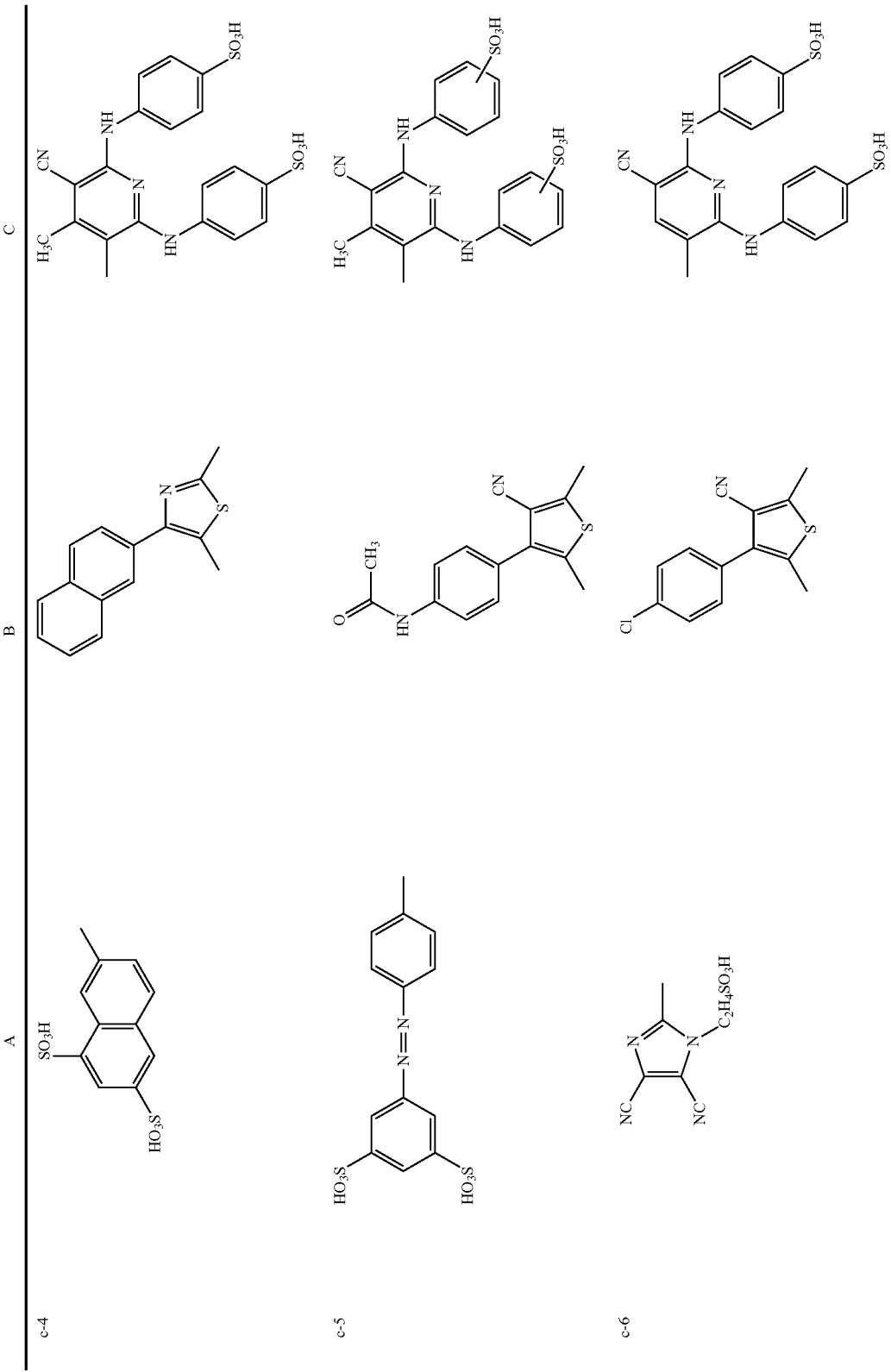

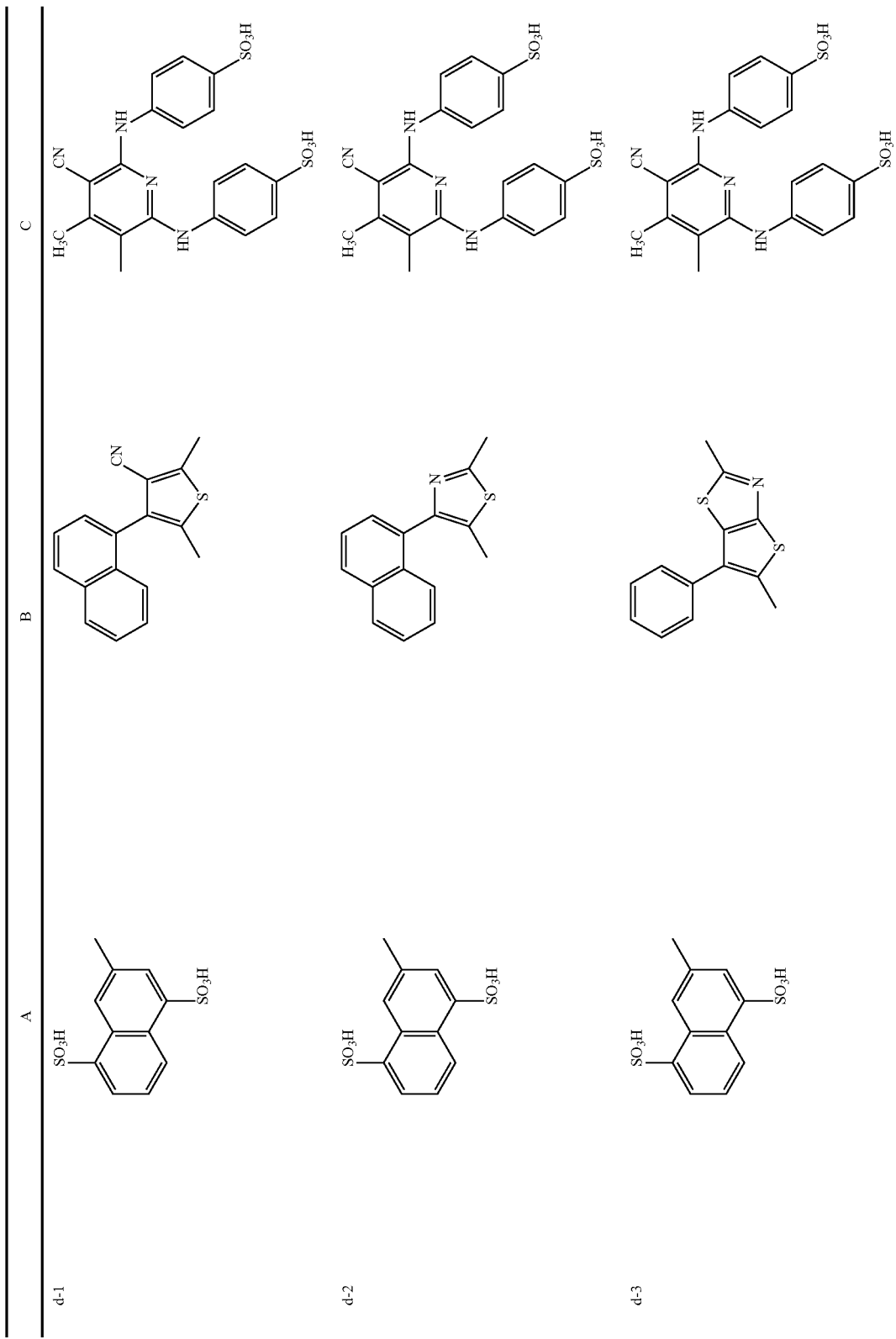

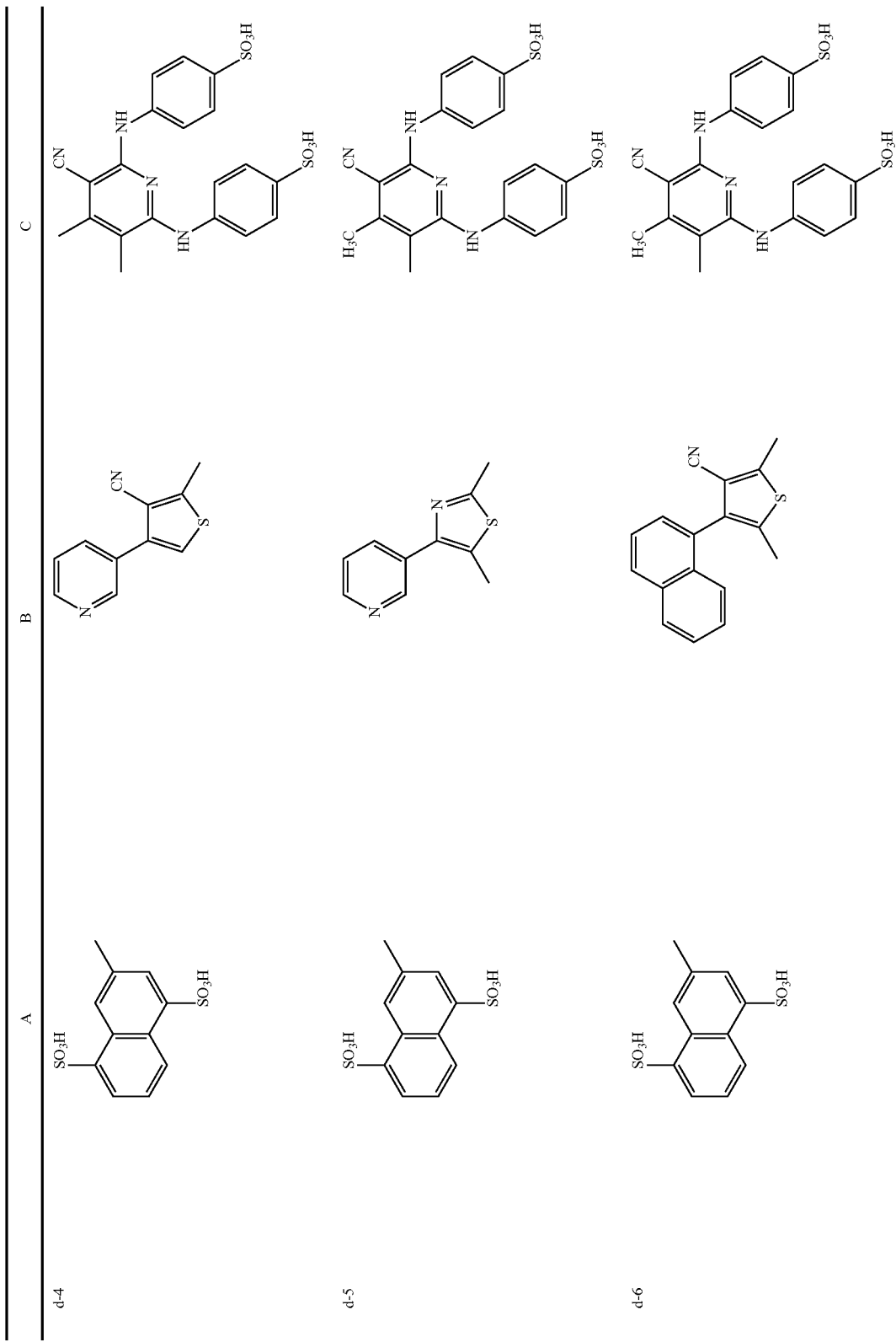

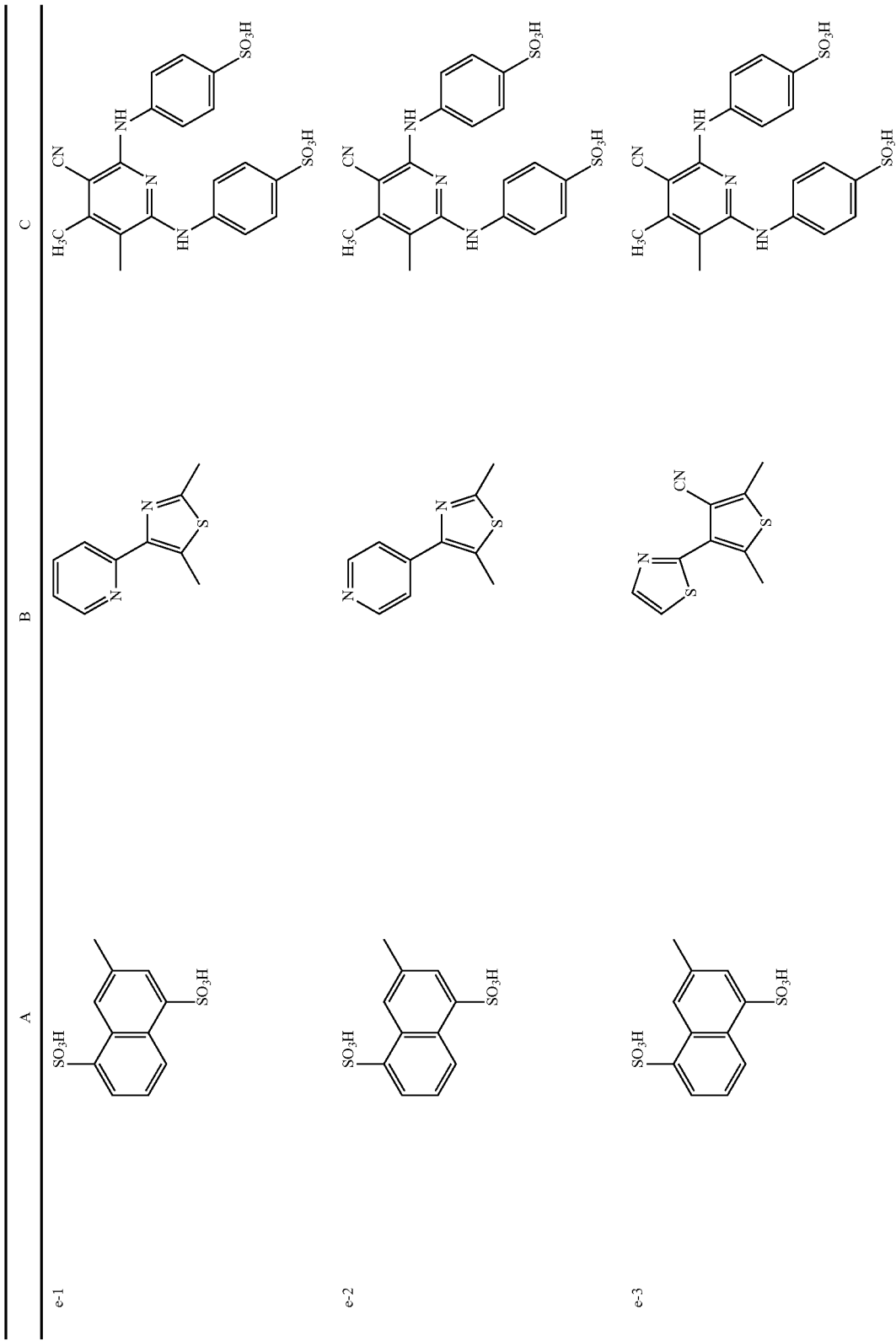

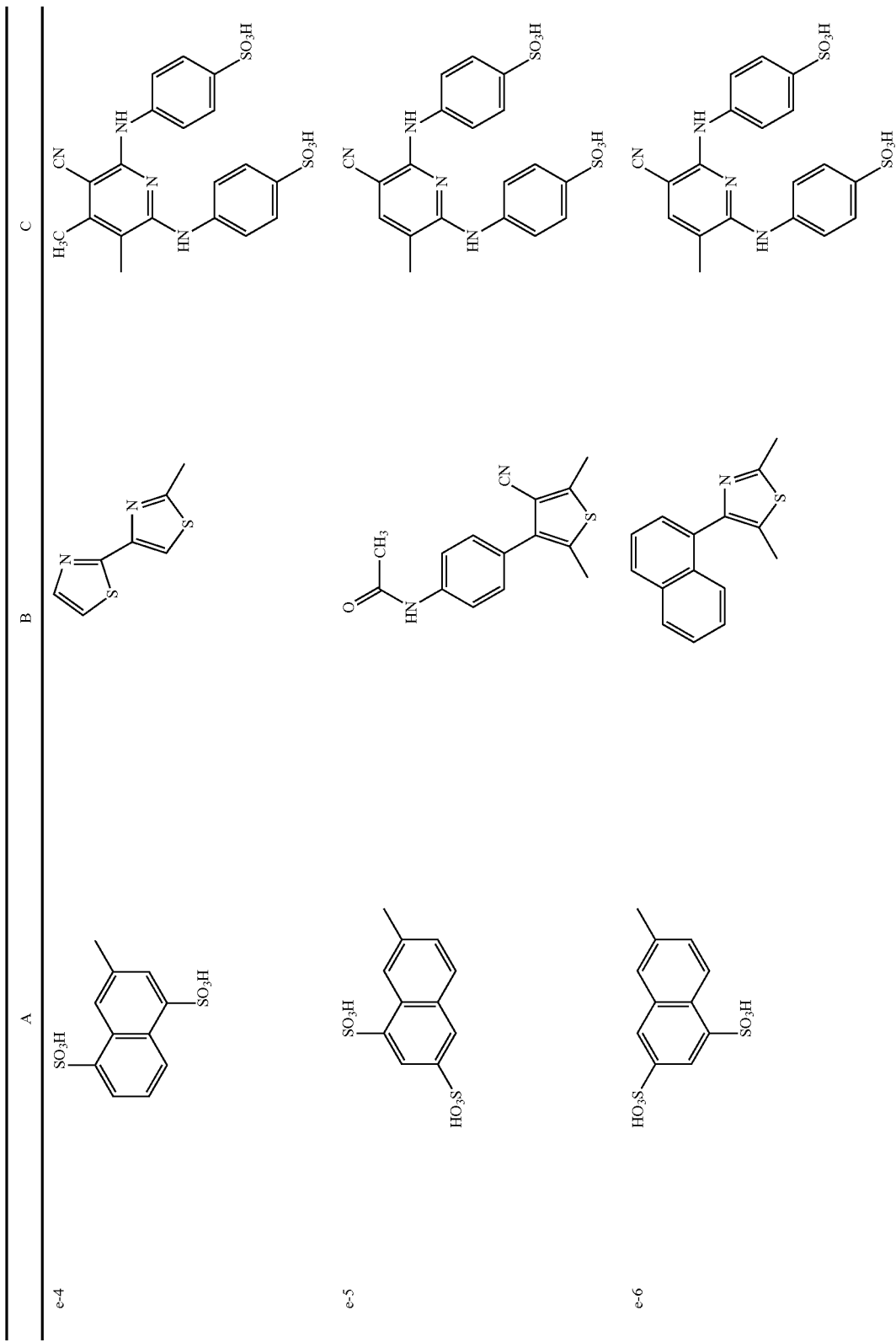

-continued
| f | A | B | C |
|---|---|---|---|
| f-1 | 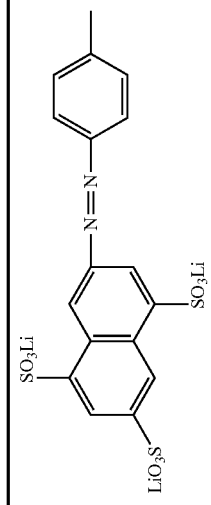 | 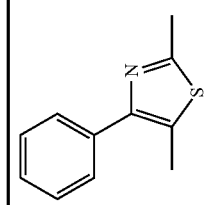 | 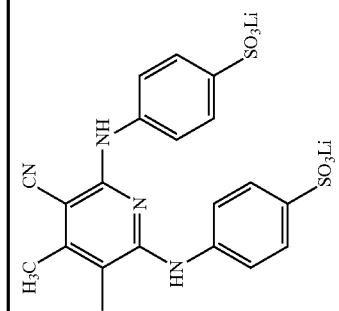 |
| f-2 | 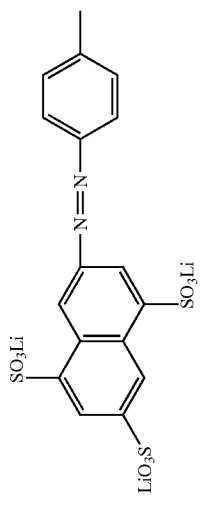 | 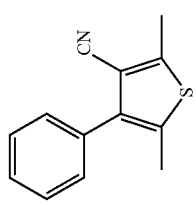 | 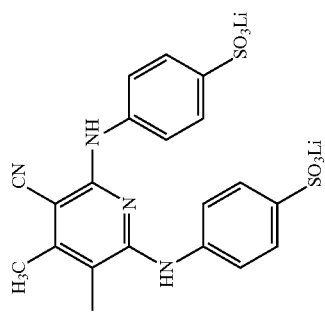 |
| f-3 | 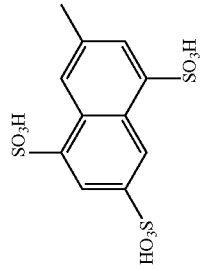 | 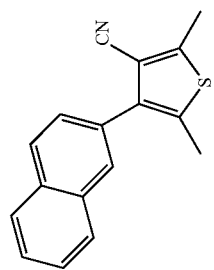 | 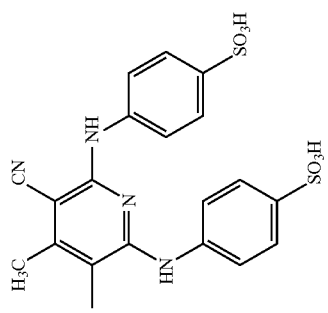 |

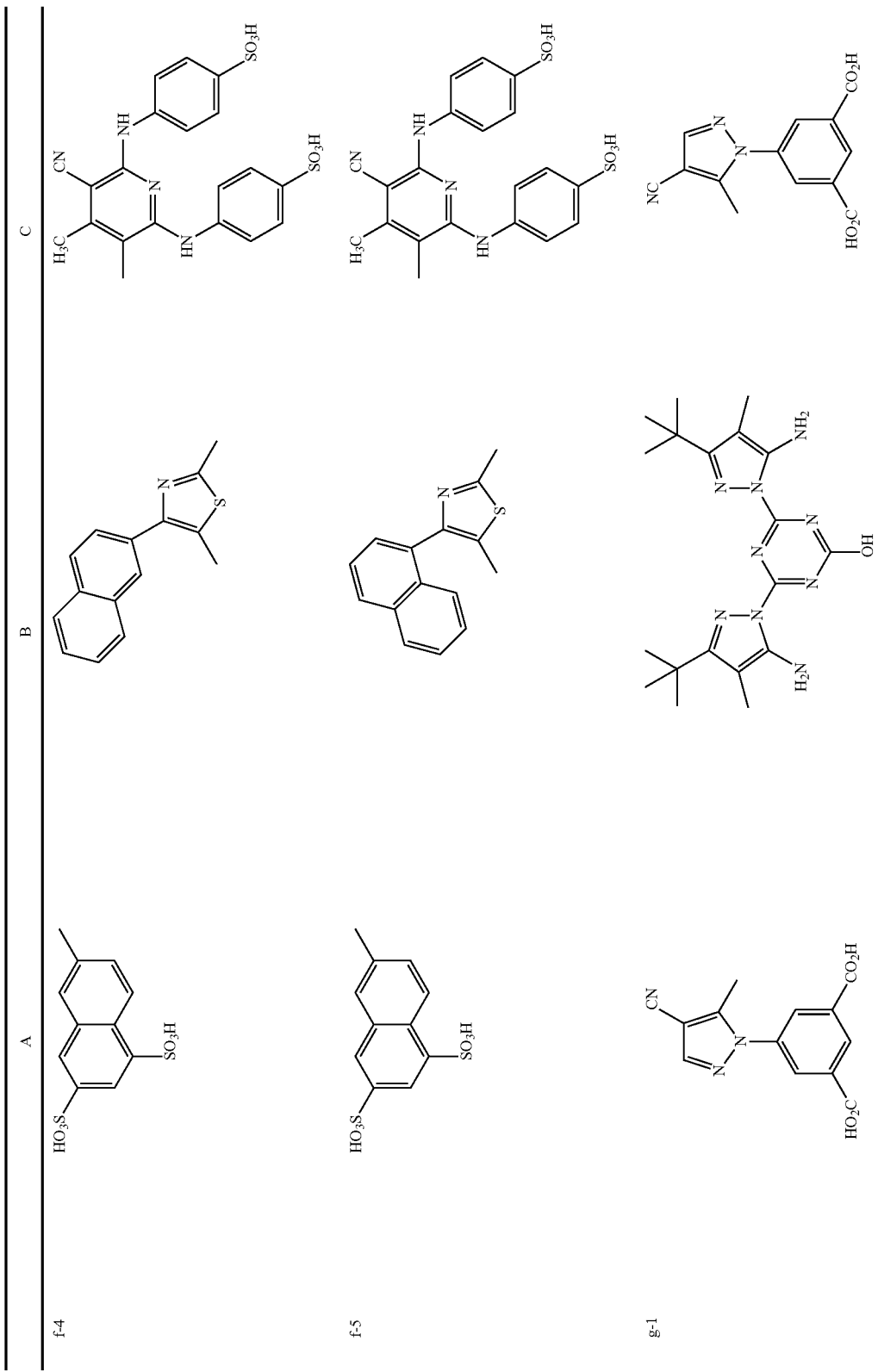

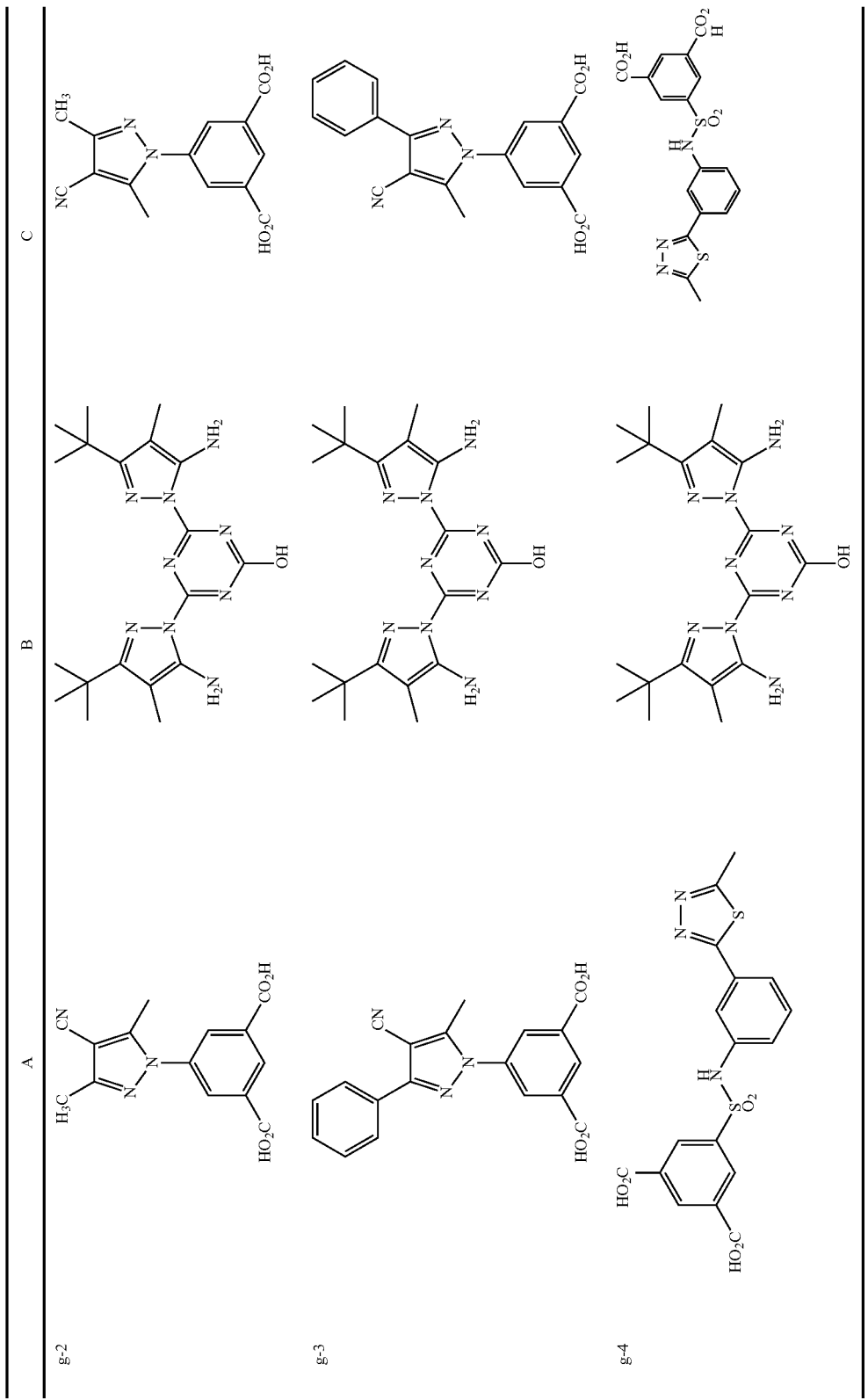

Preferred examples of the disazo dye, trisazo dye and tetrakisazo dye which can be used in the invention will be given below, but the dye to be used in the invention is not limited thereto.
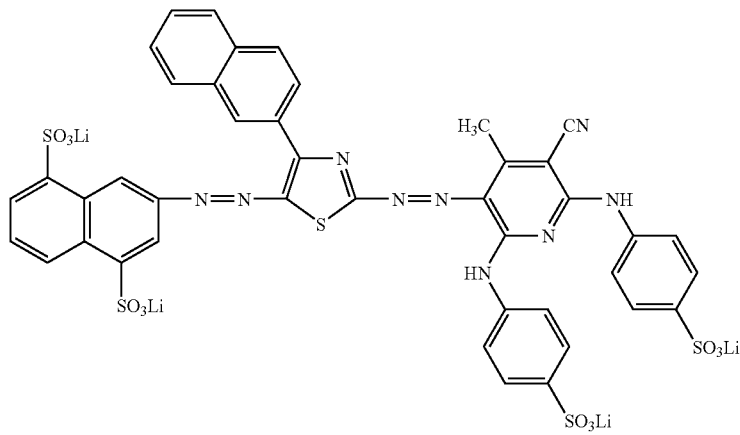
Dye 1
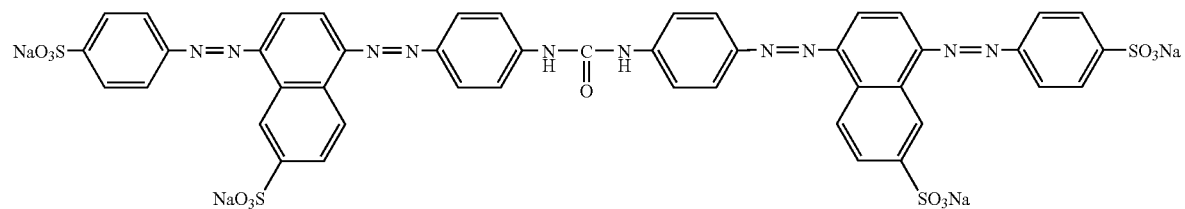
Dye 2
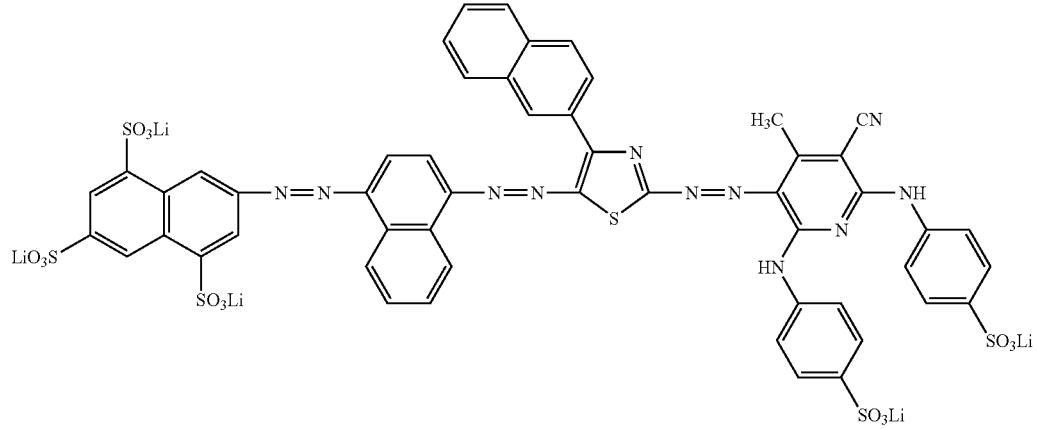
Dye 3

(Phthalocyanine Dye)

In the invention, as the cyan dye there is preferably used a phthalocyanine dye. In particular, the phthalocyanine dye represented by the following formula (5) is preferably used.

Formula (5)

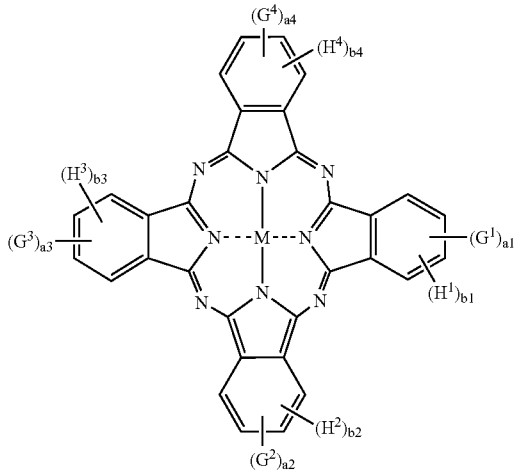

wherein $G^1$, $G^2$, $G^3$ and $G^4$ each independently represent a —SO—$R^{10}$, —SO$_2$—$R^{10}$, —SO$_2$N$^{11}$R$^{12}$, sulfo group, —CONR$^{11}$R$^{12}$ or —CO$_2$R$^{11}$ (in which $R^{10}$ represents a substituted or unsubstituted alkyl, cycloalkyl, alkenyl, aralkyl, aryl or heterocyclic group and $R^{11}$ and $R^{12}$ each independently represent a hydrogen atom or substituted or unsubstituted alkyl, cycloalkyl, aryl or heterocyclic group, with the proviso that there are a plurality of $R^{10}$'s, they may be the same or different); $H^1$, $H^2$, $H^3$ and $H^4$ each independently represent a monovalent substituent; $a_1$ to $a_4$ and $b_1$ to $b_4$ each independently represent the number of substituents $G^1$ to $G^4$ and $H^1$ to $H^4$, respectively; $a_1$ to $a_4$ each independently represent an integer of from 0 to 4, with the proviso that $a_1$ to $a_4$ are not 0 at the same time; $b_1$ to $b_4$ each independently represent an integer of from 0 to 4, with the proviso that when $a_1$ to $a_4$ and $b_1$ to $b_4$ each represent an integer of 2 or more, the plurality of $G^1$'s to $G^4$'s and $H^1$'s to $H^4$'s may be the same or different; and M represents a hydrogen atom, metal atom or oxide, hydroxide or halide thereof.

As the phthalocyanine dye there may be used also one represented by the following formula (8).

Formula (8)

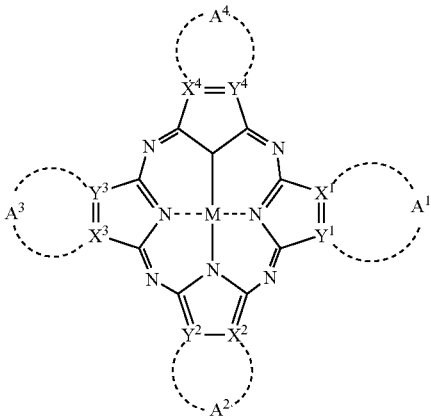

In the formula (8), $X^1$ to $X^4$ and $Y^1$ to $Y^4$ each independently represent a carbon atom or nitrogen atom, preferably carbon atom. $A^1$ to $A^4$ each independently represent an atomic group required to form an aromatic hydrocarbon ring or heterocyclic ring (which may further form a condensed ring with other rings) with $X^1$ to $X^4$ and $Y^1$ to $Y^4$. The heterocyclic ring thus formed is preferably a nitrogen-containing 6-membered ring. $A^1$ to $A^4$ may have substituents. At least one of $A^1$ to $A^4$ or at least one of substituents on $A^1$ to $A^4$ has a substituent which provides solubility (ionic hydrophilic group in the case where the dye is water-soluble or hydrophobic group in the case where the dye is oil-soluble). M is as defined in the formula (5).

More desirable among the phthalocyanine dyes represented by the formula (8) is one having a structure represented by the following formula (9).

Formula (9)

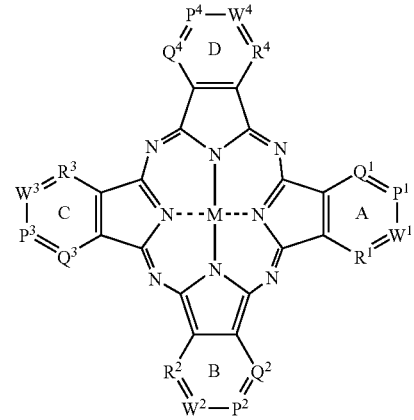

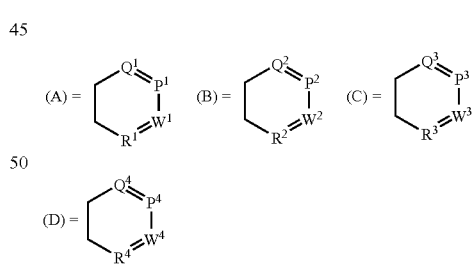

In the formula (9), $Q^1$ to $Q^4$, $P^1$ to $P^4$, $W^1$ to $W^4$ and $R^1$ to $R^4$ each independently represent (=C(J$^1$)- and/or —N=), (=C(J$^2$)- and/or —N=), (=C(J$^3$)- and/or —N=) or (=C(J$^4$)- and/or —N=). $J^1$ to $J^4$ each independently represent a hydrogen atom or substituent. At least one of four rings {Ring A: (A), Ring B: (B), Ring C: (C), Ring D: (D)} formed by ($Q^1$, $P^1$, $W^1$, $R^1$), ($Q^2$, $P^2$, $W^2$, $R^2$), ($Q^3$, $P^3$, $W^3$, $R^3$) and ($Q^4$, $P^4$, $W^4$, $R^4$), respectively, is preferably an aromatic hydrocarbon ring. More preferably, two or more of the four rings are an aromatic hydrocarbon ring. In the case where any of Ring A, Ring B, Ring C and Ring D each are a heterocyclic ring, it is preferably a pyridine ring or pyrazine ring. In the case where $J^1$ to $J^4$ each are a substituent, it is preferably an electrophilic substituent. Further, at least one of $J^1$ to $J^4$ or at least one of substituents on $J^1$ to $J^4$ has a substituent which provides solubility (ionic hydrophilic group in the case where the dye is water-soluble or hydrophobic group in the case where the dye is oil-soluble). M is as defined in the formula (5).

In the formula (9), in the case where any of Ring A, Ring B, Ring C and Ring D each are an aromatic hydrocarbon ring, it is preferably one represented by the following formula (10).

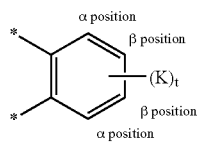

Formula (10)

In the formula (10), the symbol * indicates a position at which the ring is connected to the remaining moiety to form a phthalocyanine skeleton. In the specification, the carbon atom in the benzene ring closer to the position * is called α-position and the carbon atom in the benzene ring farther from the position * is called β-position. The formula (10) indicates that the position at which K substitutes on the molecule is identified neither as α-position nor as β-position. K represents —SO-Z, —SO$_2$-Z, —SO$_2$NV$^1$V$^2$, —CONV$^1$V$^2$, —CO$_2$-Z, —CO-Z or sulfo group. The suffix t represents an integer of from 1 to 4. Preferred among the compounds of the formula (10) is one wherein K is —SO-Z, —SO$_2$-Z, —SO$_2$NV$^1$V$^2$, —CONV$^1$V$^2$, —CO$_2$-Z or sulfo group, particularly —SO-Z, —SO$_2$-Z or —SO$_2$NV$^1$V$^2$, most preferably —SO$_2$-Z. The suffix t is preferably 1 or 2, most preferably 1. The plurality of Z's may be the same or different and each represent a substituted or unsubstituted alkyl, cycloalkyl, alkenyl, alkinyl, aralkyl, aryl or heterocyclic group, preferably substituted or unsubstituted alkyl, aryl or heterocyclic group, most preferably substituted alkyl, aryl or heterocyclic group. $V^1$ and $V^2$ may be the same or different and each represent a hydrogen atom or a substituted or unsubstituted alkyl, cycloalkyl, alkenyl, alkinyl, aralkyl, aryl or heterocyclic group, preferably hydrogen atom or substituted or unsubstituted alkyl, aryl or heterocyclic group, most preferably hydrogen atom or substituted alkyl, aryl or heterocyclic group. In the case where any of Ring A, Ring B, Ring C and Ring D in the formula (8) is an aromatic hydrocarbon ring, it is particularly preferred that at least one of the aromatic hydrocarbon rings be represented by the following formula (11). The formula (11) indicates that the position at which K substitutes on the molecule is β-position.

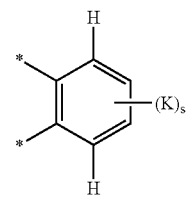

Formula (11)

In the formula (11), the symbol * indicates a position at which the ring is connected to the remaining moiety to form a phthalocyanine skeleton. K is as defined in the formula (10). The preferred, particularly preferred and most desirable ranges of K, too, are as defined in the formula (10). The suffix s is 1 or 2, most preferably 1. Most preferably, all the aromatic hydrocarbon rings are each represented by the formula (11).

Particularly preferred among these phthalocyanine dyes is one represented by the following formula (12).

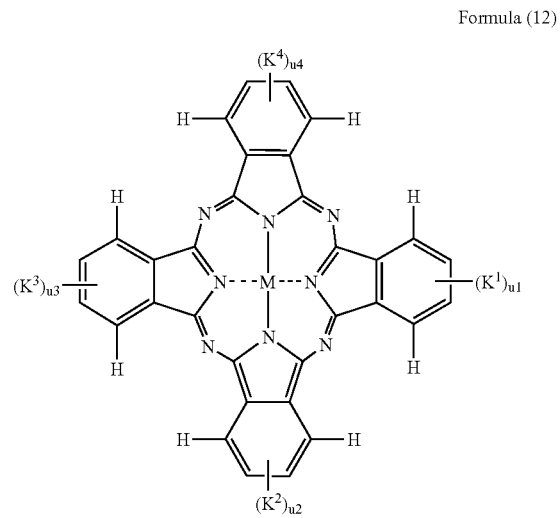

Formula (12)

In the formula (12), $K^1$ to $K^4$ each have the same meaning as K in the formula (10). The preferred, particularly preferred and most desirable ranges of $K^1$ to $K^4$ are as defined in the formula (10). M is as defined in the formula (5). The suffixes u1 to u4 each represent 1 or 2, most preferably 1.

A specific preferred examples of the phthalocyanine dye which can be used in the invention will be given below, but the phthalocyanine dyes to be used in the invention are not limited thereto.

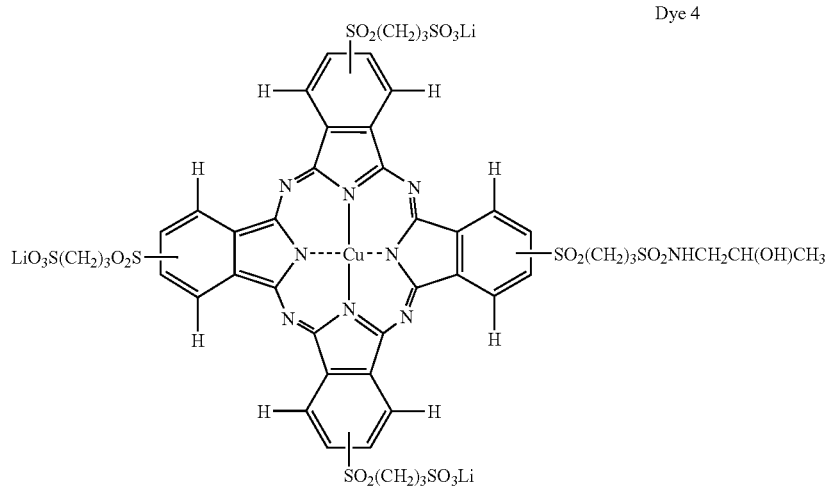

Dye 4

(Monoazo Dye)

In the invention, a monoazo dye can be also used. An example of the monoazo dye employable herein include one represented by the following formula (13).

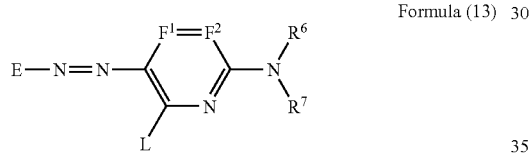

Formula (13)

In the formula (13), E represents an aromatic or heterocyclic group which may be substituted. $F^1$ and $F^2$ each represent —$CR^8$= or —$CR^9$=. Alternatively, one of $F^1$ and $F^2$ represents a nitrogen atom and the other represents —$CR^8$= or —$CR^9$=. $R^6$ and $R^7$ each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. These groups may have substituents. L, $R^8$ and $R^9$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be substituted. $R^6$ and $R^7$ or $R^6$ and $R^9$ may be connected to each other to form a 5-membered or 6-membered ring. However, the compound of the formula (13) has substituents at least one of which provides solubility (ionic hydrophilic group in the case where the dye is water-soluble or hydrophobic group in the case where the dye is oil-soluble).

More desirable among the monoazo dyes represented by the formula (13) is one having a structure represented by the following formula (7).

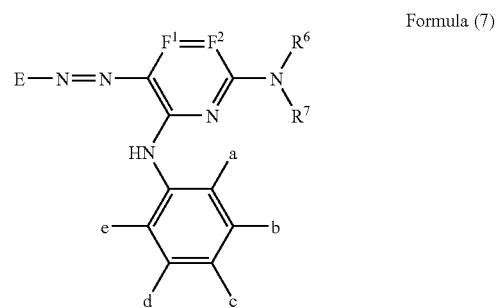

Formula (7)

In the formula (7), E represents an aromatic or heterocyclic group which may be substituted. $F^1$ and $F^2$ each represent —$CR^8$= or —$CR^9$=. Alternatively, one of $F^1$ and $F^2$ represents a nitrogen atom and the other represents —$CR^8$= or $CR^9$=. $R^6$ and $R^7$ each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. These groups may have substituents. $R^8$ and $R^9$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be substituted. $R^6$ and $R^7$ or $R^6$ and $R^9$ may be connected to each other to form a 5-membered or 6-membered ring. The symbols a and e each independently represent an alkyl group, alkoxy group or halogen atom. When the symbols a and e are an alkyl group at the same time, the total number of carbon atoms constituting the alkyl group is 3 or more. These alkyl groups may be further substituted. The symbols b, c and d each have the same meaning as $R^8$ and $R^9$. The symbols a and b or e and d may be condensed to each other. However, the compound of the formula (7) has substituents at least one of which provides solubility (ionic hydrophilic group in the case where the dye is water-soluble or hydrophobic group in the case where the dye is oil-soluble).

The dyes of the formulae (13) and (7) will be further described hereinafter.

In the formulae (13) and (7), E represents an aromatic or heterocyclic group which may be substituted, preferably 5-membered heterocyclic ring. Examples of the hetero atoms include N, O and S. E is more preferably a nitrogen-containing 5-membered heterocyclic ring to which aliphatic rings, aromatic rings or other heterocyclic rings may be condensed. Preferred examples of the heterocyclic ring represented by E include pyrazole ring, imidazole ring, thiazole ring, isothiazole ring, oxazole ring, thiadiazole ring, triazole ring, benzothiazole ring, benzooxazole ring, benzoisothiazole ring, and benzoimidazole ring. These heterocyclic rings may further have substituents. Particularly preferred examples of heterocyclic rings include pyrazole ring, imidazole ring, isothiazole ring, thiadiazole ring, benzothiazole ring and triazole ring represented by the following formulae (a) to (g).

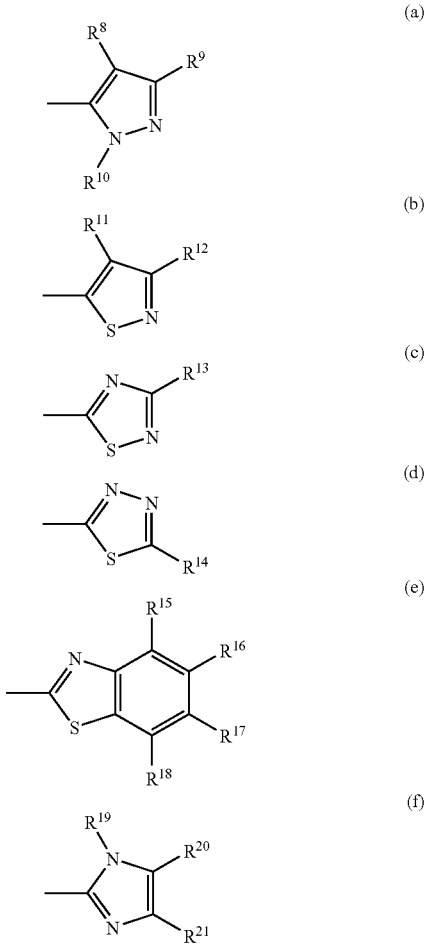

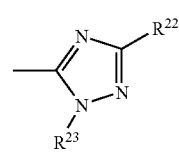

In the formulae (a) to (g), $R^8$ to $R^{23}$ have the same meaning as L, $R^8$ and $R^9$ in the formula (12).

Preferred among the heterocyclic rings represented by the formulae (a) to (g) are pyrazole ring, isothiazole ring and triazole ring represented by the formulae (a), (b) and (g), respectively. Most desirable among these heterocyclic rings is pyrazole ring represented by the formula (a).

In the formulae (13) and (7), $F^1$ and $F^2$ each represent —$CR^8$═ or —$CR^9$═ or either one of them represents a nitrogen atom and the other represents —$CR^8$═ or —$CR^9$═. Preferably, $F^1$ and $F^2$ represent —$CR^8$═ or —$CR^9$═.

$R^6$ and $R^7$ each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. These groups may have substituents. Preferred examples of the substituents represented by $R^6$ and $R^7$ include hydrogen atom, aliphatic group, aromatic group, heterocyclic group, acyl group, alkyl group, and arylsulfonyl group. More desirable among these substituents are hydrogen atom, aromatic group, heterocyclic group, acyl group, alkylsulfonyl group, and arylsulfonyl group. Most desirable among these substituents are hydrogen atom, aryl group, and heterocyclic group. These groups may further have substituents. However, $R^6$ and $R^7$ are not a hydrogen atom at the same time.

In the formula (13), L, $R^8$ and $R^9$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be substituted. Preferred examples of the substituent represented by L include hydrogen atom, halogen atom, aliphatic group, aromatic group, hydroxyl group, alkoxy group, aryloxy group, acyloxy group, heterocyclic oxy group, amino group (including anilino group and heterocyclic amino group), acylamino group, ureido group, sulfamoylamino group, alkoxycarbonylamino group, aryloxycarbonylamino group, alkylthio group, arylthio group, and heterocyclic thio group. More desirable among these substituents are hydrogen atom, halogen atom, alkyl group, hydroxyl group, alkoxy group, aryloxy group, acyloxy group, amino group (including anilino group and heterocyclic amino group) and acylamino group. Most desirable among these substituents is one represented by the formula (7). These substituents may further have substituents. The symbols a and e each independently represent an alkyl group, alkoxy group or halogen atom. When the symbols a and e are an alkyl group at the same time, the total number of carbon atoms constituting the alkyl group is 3 or more. These alkyl groups may be further substituted. The symbols b, c and d each have the same meaning as $R^8$ and $R^9$. The symbols a and b or e and d may be condensed to each other. However, the compounds of the formulae (13) and (7) have substituents at least one of which provides solubility (ionic hydrophilic group in the case where the dye is water-soluble or hydrophobic group in the case where the dye is oil-soluble).

Preferred examples of the substituents represented by $R^8$ and $R^9$ include hydrogen atom, alkyl group, halogen atom, alkoxycarbonyl group, carboxyl group, carbamoyl group, hydroxyl group, alkoxy group, and cyano group. These substituents may further have substituents.

$R^6$ and $R^7$ or $R^6$ and $R^9$ may be connected to each other to form a 5-membered or 6-membered ring.

Examples of the substituents on the substituents represented by E, $R^6$, $R^7$, $R^8$, $R^9$ and L which further have substituents include those listed above with reference to L, $R^8$ and $R^9$.

Further examples of the monoazo dye employable herein include those represented by the following formulae (14) to (16).

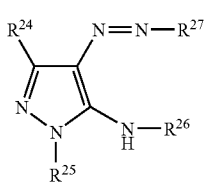

Formula (14)

In the formula (14), $R^{24}$ and $R^{26}$ each represent a hydrogen atom, cyano group, alkyl group, cycloalkyl group, aralkyl group, alkoxy group, alkylthio group, arylthio group, aryl group or ionic hydrophilic group, $R^{25}$ represents a hydrogen atom, alkyl group, cycloalkyl group, carbamoyl group, acyl group, aryl group or heterocyclic group, and $R^{27}$ represents a heterocyclic group.

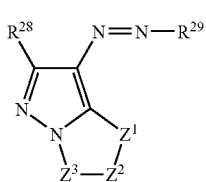

Formula (15)

wherein $R^{28}$ represents a hydrogen atom, cyano group, alkyl group, cycloalkyl group, aralkyl group, alkoxy group, alkylthio group, arylthio group, aryl group or ionic hydrophilic group; $Z^1$ represents —N=, —NH— or —C($R^{34}$)= (in which $R^{34}$ represents a hydrogen atom or nonmetallic substituent); $Z^2$ and $Z^3$ each independently represent —N= or —C($R^{34}$)=; and $R^{29}$ represents a heterocyclic group.

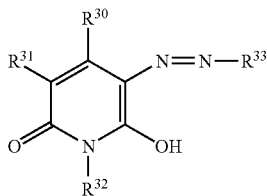

Formual (16)

wherein $R^{30}$ and $R^{32}$ each independently represent a hydrogen atom, cyano group, alkyl group, cycloalkyl group, aralkyl group, aryl group, alkylthio group, arylthio group, alkoxycarbonyl group, carbamoyl group or ionic hydrophilic group; $R^{31}$ represents a hydrogen atom, halogen atom, alkyl group, alkoxy group, aryl group, aryloxy group, cyano group, acylamino group, sulfonylamino group, alkoxycarbonylamino group, ureido group, alkylthio group, arylthio group, alkoxycarbonyl group, carbamoyl group, sulfamoyl group, sulfonyl group, acyl group, alkylamino group, arylamino group, hydroxyl group or ionic hydrophilic group; and $R^{33}$ represents a heterocyclic group.

In the formulae (14), (15) and (16), examples of the alkyl groups represented by $R^{24}$, $R^{25}$, $R^{26}$, $R^{28}$, $R^{30}$, $R^{31}$ and $R^{32}$ include substituted alkyl groups and unsubstituted alkyl groups. As the alkyl group there is preferably used one having from 1 to 20 carbon atoms. Examples of the substituents on the alkyl group include hydroxyl group, alkoxy group, cyano group, halogen atom, and ionic hydrophilic group. Examples of these alkyl groups include methyl, ethyl, butyl, isopropyl, t-butyl, hydroxyethyl, methoxyethyl, cyanoethyl, trifluoromethyl, 3-sulfopropyl, and 4-sulfobutyl.

Examples of the cycloalkyl groups represented by $R^{24}$, $R^{25}$, $R^{26}$, $R^{28}$, $R^{30}$, $R^{31}$ and $R^{32}$ include substituted cycloalkyl groups and unsubstituted cycloalkyl groups. As the cycloalkyl group there is preferably used one having from 5 to 12 carbon atoms. Examples of the substituents on the cycloalkyl group include ionic hydrophilic groups. Examples of the cycloalkyl group include cyclohexyl. Examples of the aralkyl group represented by $R^{24}$, $R^{25}$, $R^{26}$, $R^{28}$, $R^{30}$, $R^{31}$ and $R^{32}$ include substituted and unsubstituted aralkyl groups. As the aralkyl group there is preferably used one having from 7 to 20 carbon atoms. Examples of the substituents on the aralkyl group include ionic hydrophilic groups. Examples of the aralkyl group include benzyl, and 2-phenethyl.

Examples of the aryl group represented by $R^{24}$, $R^{25}$, $R^{26}$, $R^{28}$, $R^{30}$ and $R^{32}$ include substituted and unsubstituted aryl groups. As the aryl group there is preferably used one having from 6 to 20 carbon atoms. Examples of the substituents on the aryl group include hydroxyl group, alkyl group, alkoxy group, halogen atom, cyano group, carbamoyl group, sulfamoyl group, alkylamino group, acylamino group, and ionic hydrophilic group. Examples of the aryl group include phenyl, p-tollyl, p-methoxyphenyl, o-chlorophenyl, and m-(3-sulfopropylamino)phenyl.

Examples of the alkylthio group represented by $R^{24}$, $R^{25}$, $R^{26}$, $R^{28}$, $R^{30}$, $R^{31}$ and $R^{32}$ include substituted and unsubstituted alkylthio groups. As the alkylthio group there is preferably used one having from 1 to 20 carbon atoms. Examples of the substituents on the alkylthio group include ionic hydrophilic groups. Examples of the alkylthio group include methylthio and ethylthio. Examples of the arylthio groups represented by $R^{24}$, $R^{25}$, $R^{26}$, $R^{28}$, $R^{30}$, $R^{31}$ and $R^{32}$ include substituted and unsubstituted arylthio groups. As the arylthio group there is preferably used one having from 6 to 20 carbon atoms. Examples of the substituents on the arylthio group include those listed above with reference to the aryl group. Examples of the arylthio group include phenylthio group and p-tollylthio group.

The heterocyclic group represented by $R^{25}$ is preferably a 5-membered or 6-membered heterocyclic ring which may be further condensed. Preferred examples of the hetero atoms constituting the heterocyclic ring include N, S, and O. The heterocyclic ring may be an aromatic or nonaromatic heterocyclic ring. The heterocyclic ring may be further substituted. Examples of the substituents on the heterocyclic ring include those listed above with reference to the aryl group. Preferred examples of the heterocyclic ring include 6-membered nitrogen-containing aromatic heterocyclic rings. Particularly preferred among these heterocyclic rings are triazine, pyrimidine, and phthalazine.

Examples of the halogen atom represented by $R^{31}$ include fluorine atom, chlorine atom, and bromine atom. Examples of the alkoxy groups represented by $R^{24}$, $R^{26}$, $R^{28}$ and $R^{31}$ include substituted and unsubstituted alkoxy groups. As the alkoxy group there is preferably used one having from 1 to 20 carbon atoms. Examples of the substituents on the alkoxy group include hydroxyl group, and ionic hydrophilic groups. Examples of the alkoxy group include methoxy, ethoxy, isopropoxy, methoxyethoxy, hydroxyethoxy, and 3-carboxypropoxy.

Examples of the aryloxy group represented by $R^{31}$ include substituted and unsubstituted aryloxy groups, As the aryloxy group there is preferably used one having from 6 to 20 carbon atoms. Examples of the substituents on the aryloxy group include those listed above with reference to aryl group. Examples of the aryloxy group include phenoxy, p-methoxyphenoxy, and o-methoxyphenoxy. Examples of the acylamino group represented by $R^{31}$ include substituted and unsubstituted acylamino groups. As the acylamino group there is preferably used one having from 2 to 20 carbon atoms. Examples of the substituents on the acylamino group include those listed above with reference to aryl group. Examples of the acylamino group include acetamide, propionamide, benzamide, and 3,5-disulfobenzamide.

Examples of the sulfonylamino group represented by $R^{31}$ include alkylsulfonylamino group, arylsulfonylamino group, and heterocyclic sulfonylamino group. The alkyl moiety, aryl moiety and heterocyclic moiety of these sulfonylamino groups may have substituents. Examples of the substituents on these sulfonylamino groups include those listed above with reference to aryl group. As the sulfonylamino group there is preferably used one having from 1 to 20 carbon atoms. Examples of the sulfonylamino group include methyl sulfonylamino group, and ethyl sulfonylamino group. Examples of the alkoxycarbonylamiono group represented by $R^{31}$ include substituted and unsubstituted alkoxycarbonylamino groups. As the alkoxycarbonylamino group there is preferably used one having from 2 to 20 carbon atoms. Examples of the substituents on the alkoxycarbonylamino group include ionic hydrophilic groups. Examples of the alkoxycarbonylamino group include ethoxy carbonylamino.

Examples of the ureido group represented by $R^{31}$ include substituted and unsubstituted ureido groups. As the ureido group there is preferably used one having from 1 to 20 carbon atoms. Examples of the substituents on the ureido group include alkyl group, and aryl group. Examples of the ureido group include 3-methyl ureido, 3,3-dimethyl ureido, and 3-phenyl ureido.

Examples of the alkoxycarbonyl group represented by $R^7$, $R^8$ and $R^9$ include substituted and unsubstituted alkoxycarbonyl groups. As the alkoxycarbonyl group there is preferably used one having from 2 to 20 carbon atoms. Examples of the substituents on the alkoxycarbonyl group include ionic hydrophilic groups. Examples of the alkoxycarbonyl group include methoxy carbonyl, and ethoxy carbonyl.

Examples of the carbamoyl group represented by $R^{25}$, $R^{30}$, $R^{31}$ and $R^{32}$ include substituted and unsubstituted carbamoyl groups. Examples of the substituents on the carbamoyl group include alkyl groups. Examples of the carbamoyl group include methyl carbamoyl group, and dimethyl carbamoyl group. Substituted and unsubstituted sulfamoyl groups having substituents represented by $R^{31}$ are included.

Examples of the substituents on the carbamoyl group include alkyl groups. Examples of the sulfamoyl group include dimethyl sulfamoyl group, and di-(2-hydroxyethyl) sulfamoyl group.

Examples of the sulfonyl group represented by $R^{31}$ include alkylsulfonyl group, arylsulfonyl group, and heterocyclic sulfonyl group which may be further substituted. Examples of the substituents on the sulfonyl group include ionic hydrophilic groups. Examples of the sulfonyl group include methyl sulfonyl and phenyl sulfonyl. Examples of the acyl group represented by $R^{25}$ and $R^{31}$ include substituted and unsubstituted acyl groups. As the acyl group there is preferably used one having from 1 to 20 carbon atoms.

Examples of the substituents on the acyl group include ionic hydrophilic groups. Examples of the acyl group include acetyl and benzoyl.

Examples of the amino group represented by $R^{31}$ include substituted and unsubstituted amino groups. Examples of the substituents on the amino group include alkyl group, aryl group, and heterocyclic group. Examples of the amino group include methylamino, diethylamino, anilino, and 2-chloroanilino.

Examples of the heterocyclic group represented by $R^{27}$, $R^{29}$ and $R^{33}$ include heterocyclic groups represented by E in the formulae (13) and (7) which may be substituted. The preferred, more desirable and particularly preferred ranges of the heterocyclic group are as defined above. Examples of the substituents include ionic hydrophilic groups, and $C_1$-$C_{12}$ alkyl, aryl, alkylthio and arylthio group, halogen atom, cyano group, sulfamoyl, sulfonamino group, carbamoyl group, and acylamino group. The alkyl group, aryl group and other substituents may further have substituents.

In the formula (15), $Z^1$ represents —N=, —NH— or —C($R^{34}$)= (in which $R^{34}$ represents a hydrogen atom or nonmetallic substituent) and $Z^2$ and $Z^3$ each independently represent —N= or —C($R^{34}$)=. Preferred examples of the nonmetallic substituent represented by $R^{34}$ include cyano group, cycloalkyl group, aralkyl group, aryl group, alkylthio group, arylthio group, and ionic hydrophilic group. The aforementioned various substituents have the same meaning as the various substituents represented by $R^{24}$. Preferred examples of these substituents are as defined above with reference to $R^{24}$. Examples of the skeleton of the heterocyclic ring formed by two 5-membered rings included in the formula (15) will be given below.

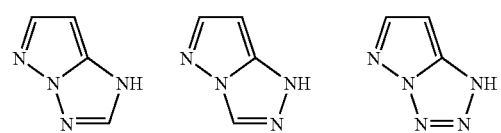

Examples of the aforementioned substituents which may further have substituents include substituents represented by E in the formulae (13) and (7) which may be further substituted.

Preferred among the monoazo dyes represented by the formulae (14) to (16) is one represented by the formula (14). Particularly preferred among the monoazo dyes represented by the formula (14) is one represented by the following formula (17).

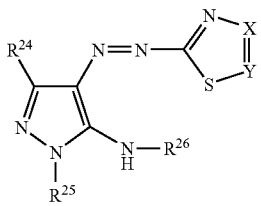

Formula (17)

In the formula (17), $R^{24}$, $R^{25}$ and $R^{26}$ are as defined in the formula (14). One of X and Y represents a nitrogen atom and the other represents —$CR^{35}$. $R^{35}$ represents a hydrogen atom, halogen atom, cyano group, alkyl group, alkylthio group, alkylsulfonyl group, alkylsulfonyl group, alkyloxycarbonyl group, carbamoyl group, alkoxy group, aryl group, arylthio group, arylsulfonyl group, arylsulfinyl group, aryloxy group or acylamino group. Preferred among these groups are hydrogen atom, alkyl group, alkylthio group, arylthio group, and aryl group. Particularly preferred among these groups are hydrogen atom, alkylthio group, and aryl group. These substituents may be further substituted.

The ink for ink jet recording of the invention may further comprise an azo dye represented by the following formula (18), (19), (20) or (21) incorporated therein in combination with the aforementioned dyes to exert similar effects.

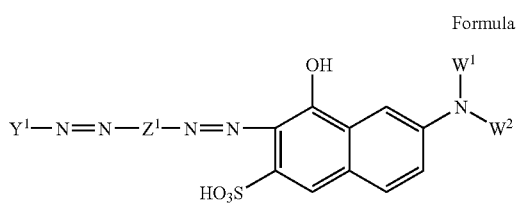

Formula (18)

In the formula (18), $Y^1$ and $Z^1$ each independently represent a substituted or unsubstituted aromatic or heterocyclic group ($Y^1$ represents a monovalent group and $Z^1$ represents a divalent group), and $W^1$ and $W^2$ each independently represent a hydrogen atom or substituent.

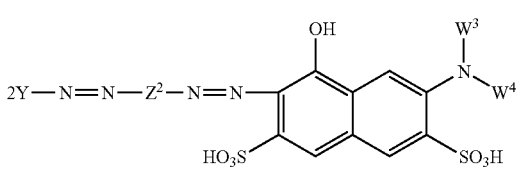

Formula (19)

In the formula (19), $Y^2$ and $Z^2$ each independently represent a substituted or unsubstituted aromatic or heterocyclic group ($Y^2$ represents a monovalent group and $Z^2$ represents a divalent group), and $W^3$ and $W^4$ each independently represent a hydrogen atom or substituent.

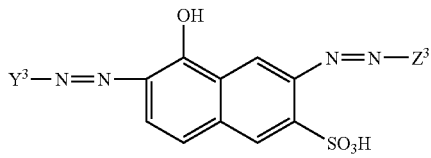

Formula (20)

In the formula (20), $Y^3$ and $Z^3$ each independently represent a substituted or unsubstituted aromatic or heterocyclic group ($Y^3$ and $Z^3$ each represent a monovalent group).

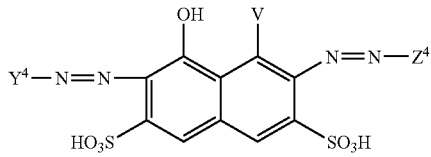

Formula (21)

In the formula (21), V represents OH group or $NH^2$ group; and $Y^4$ and $Z^4$ each independently represents a substituted or unsubstituted aromatic or heterocyclic group ($Y^4$ and $Z^4$ each represents a monovalent group).

The formulae (18), (19), (20) and (21) will be described hereinafter.

In the formula (18), $Y^1$ and $Z^1$ each independently represent a substituted or unsubstituted aromatic group ($Y^1$ represents a monovalent aromatic group such as aryl group and $Z^1$ represents a divalent aromatic group such as arylene group) or substituted or unsubstituted heterocyclic group ($Y^1$ represents a monovalent heterocyclic group and $Z^1$ represents a divalent aromatic group). Examples of the aromatic ring include benzene ring, and naphthalene ring. Examples of the hetero atoms constituting the heterocyclic ring include N, O and S. The heterocyclic ring may be condensed with aliphatic rings, aromatic rings or other heterocyclic rings. Examples of the substituents on $Y^1$ and $Z^1$ include those listed above with reference to L in the formula (13), arylazo group, and heterocyclic azo group.

$W^1$ and $W^2$ each independently represent a hydrogen atom or substituent. Examples of the substituents represented by $W^1$ and $W^2$ include those listed above with reference to L in the formula (13).

In the formula (19), $Y^2$ and $Z^2$ each independently represent a substituted or unsubstituted aromatic group ($Y^2$ represents a monovalent aromatic group such as aryl group and $Z^2$ represents a divalent aromatic group such as arylene group) or substituted or unsubstituted heterocyclic group ($Y^2$ represents a monovalent heterocyclic group and $Z^2$ represents a divalent aromatic group). Examples of the aromatic ring include benzene ring, and naphthalene ring. Examples of the hetero atoms constituting the heterocyclic ring include N, O and S. The heterocyclic ring may be condensed with aliphatic rings, aromatic rings or other heterocyclic rings. Examples of the substituents on $Y^2$ and $Z^2$ include those listed above with reference to L in the formula (13), arylazo group, and heterocyclic azo group.

$W^3$ and $W^4$ each independently represent a hydrogen atom or substituent. Examples of the substituents represented by $W^3$ and $W^4$ include those listed above with reference to L in the formula (13).

In the formula (20), $Y^3$ and $Z^3$ each independently represent a substituted or unsubstituted aromatic group ($Y^3$ and $Z^3$ each represent a monovalent aromatic group such as aryl group) or substituted or unsubstituted heterocyclic group ($Y^3$ and $Z^2$ each represent a monovalent heterocyclic group). Examples of the aromatic ring include benzene ring, and naphthalene ring. Examples of the hetero atoms constituting the heterocyclic ring include N, O and S. The heterocyclic ring may be condensed with aliphatic rings, aromatic rings or other heterocyclic rings. Examples of the substituents on $Y^3$ and $Z^3$ include those listed above with reference to L in the formula (13), arylazo group, and heterocyclic azo group.

In the formula (21), V represents OH group or $NH_2$ group and $Y^4$ and $Z^4$ each independently represent a substituted or unsubstituted aromatic group ($Y^4$ and $Z^4$ each represent a monovalent aromatic group such as aryl group) or substituted or unsubstituted heterocyclic group ($Y^4$ and $Z^4$ each represent a monovalent heterocyclic group). Examples of the aromatic ring include benzene ring, and naphthalene ring. Examples of the hetero atoms constituting the heterocyclic ring include N, O and S. The heterocyclic ring may be condensed with aliphatic rings, aromatic rings or other heterocyclic rings. Examples of the substituents on $Y^4$ and $Z^4$ include those listed above with reference to L in the formula (13), arylazo group, and heterocyclic azo group.

The carboxyl group, phosphono group and sulfo group in the formulae (18), (19), (20) and (21) may be in the form of salt. Examples of the counter ion constituting the salt include ammonium ion, alkaline metal ion (e.g., lithium ion, sodium ion, potassium ion), and organic cation (e.g., tetramethyl ammonium ion, tetramethyl guanidium ion, tetramethyl phosphonium). The azo dye represented by the formula (18), (19), (20) or (21) may form a chelate complex with metal.

Specific examples of the azo dyes represented by the formulae (18), (19), (20) and (21) will be given below, but the azo dye to be used in the invention is not limited thereto.

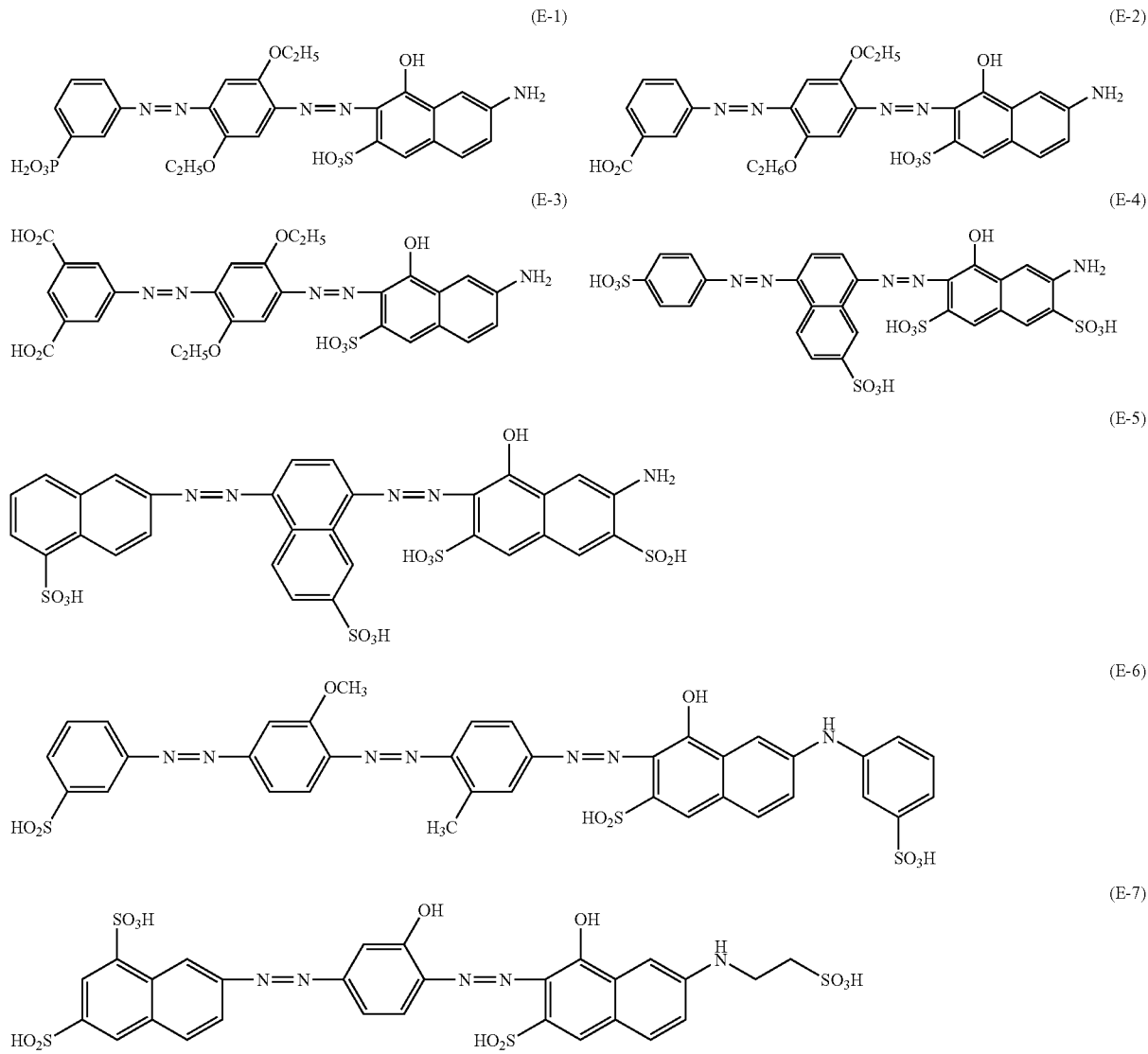

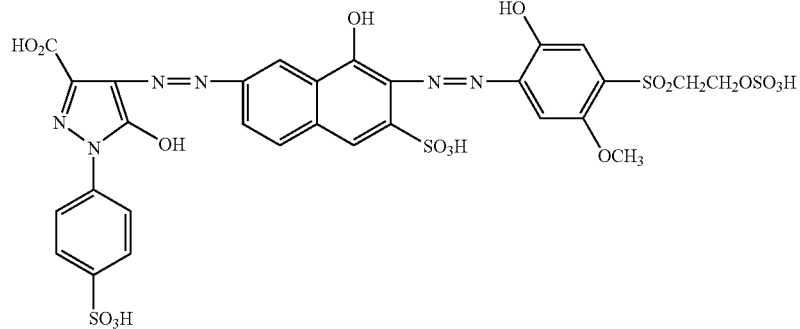

(E-8)

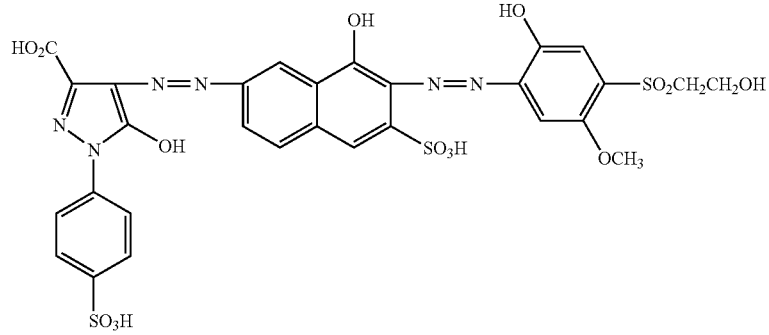

(E-9)

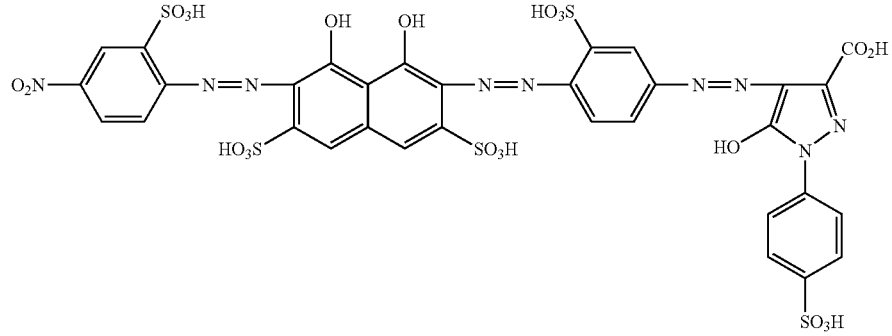

(E-10)

The ink for ink jet recording of the invention may further comprise an anthrapyridone dye represented by the following formula (22), (23) or (25) to exert similar effects.

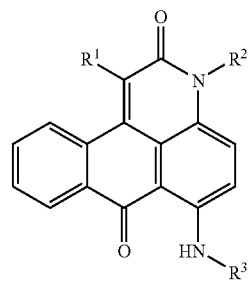

Formula (22)

In the formula (22), $R^1$ and $R^3$ each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. $R^2$ represents a hydrogen atom, alkyl group, alkoxy lower alkyl group, alkoxy lower alkoxy lower alkyl group, hydroxy lower alkyl group, cyclohexyl group, monoalkylaminoalkyl group, dialkylaminoalkyl group or cyano lower alkyl group. The groups $R^1$, $R^2$ and $R^3$ may further have substituents. However, the compound of the formula (22) has substituents at least one of which provides solubility (ionic hydrophilic group in the case where the dye is water-soluble or hydrophobic group in the case where the dye is oil-soluble).

More desirable among the anthrapyridone dyes represented by the formula (22) is one having a structure represented by the following formula (23).

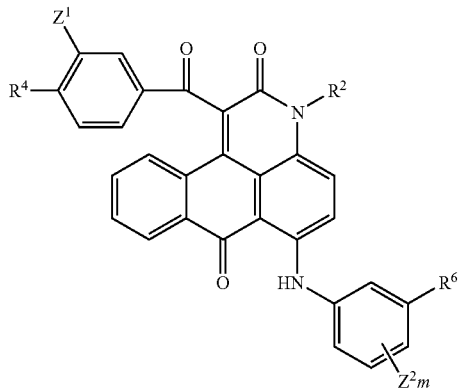

Formula (23)

In the formula (23), $R^2$ is as defined in the formula (22). $R^4$ represents a hydrogen atom or methoxy group. $R^5$ represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group. These groups may further have substituents. $Z^1$ and $Z^2$ each independently represent a hydrogen atom or ionic hydrophilic group. The suffix m represents an integer of 0 to 2.

Examples of the substituents represented by $R^5$ include those represented by the following formula (24).

Formula (24)

$R^6$ and $R^7$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group These groups may further have substituents.

Further, an anthrapyrolidone dye represented by the following formula (25) having two molecules of anthrapyridone may be used.

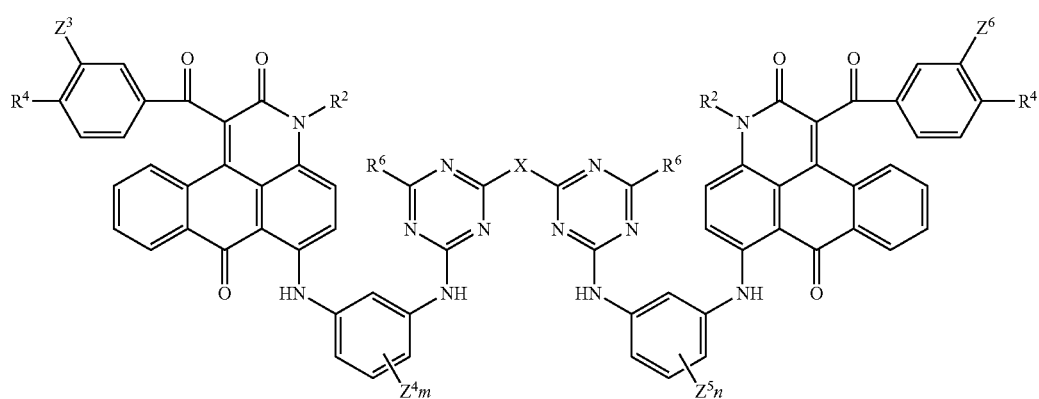

Formula (25)

X represents a connecting group which may be substituted. $R^2$, $R^4$ and $R^6$ are as defined in the formulae (23) and (24). $Z^3$ to $Z^6$ each independently represent a hydrogen atom or ionic hydrophilic group. The suffixes n and m each independently represent an integer of from 0 to 2.

Specific examples of the anthrapyridone dyes represented by the formulae (22), (23) and (24) will be given below, but the anthrapyridone dye to be used in the invention is not limited thereto. The dyes in the following specific examples may be in the form of salt. Examples of the counter ion constituting the salt include ammonium ion, alkaline metal ion (e.g., lithium ion, sodium ion, potassium ion), and organic cation (e.g., tetramethyl ammonium ion, tetramethyl guanidium ion, tetramethyl phosphonium).

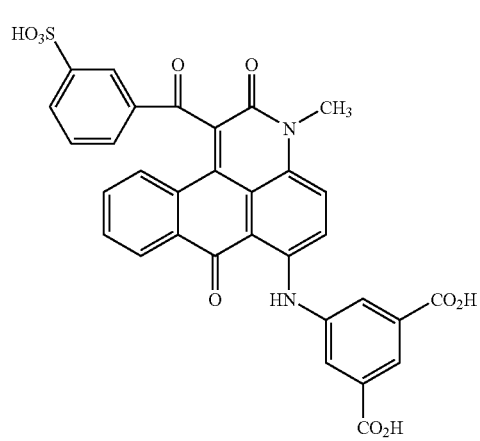

(F-1)

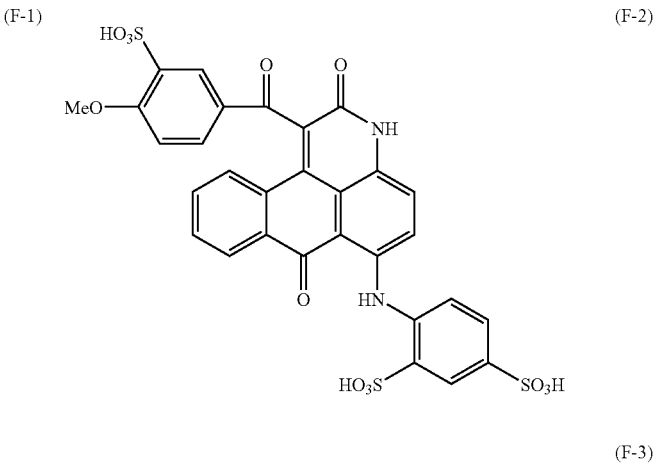

(F-2)

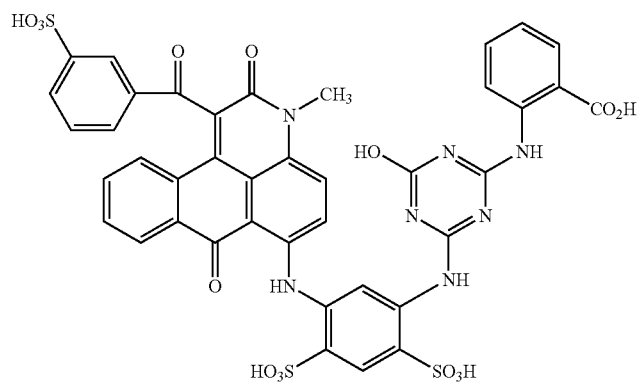

(F-3)

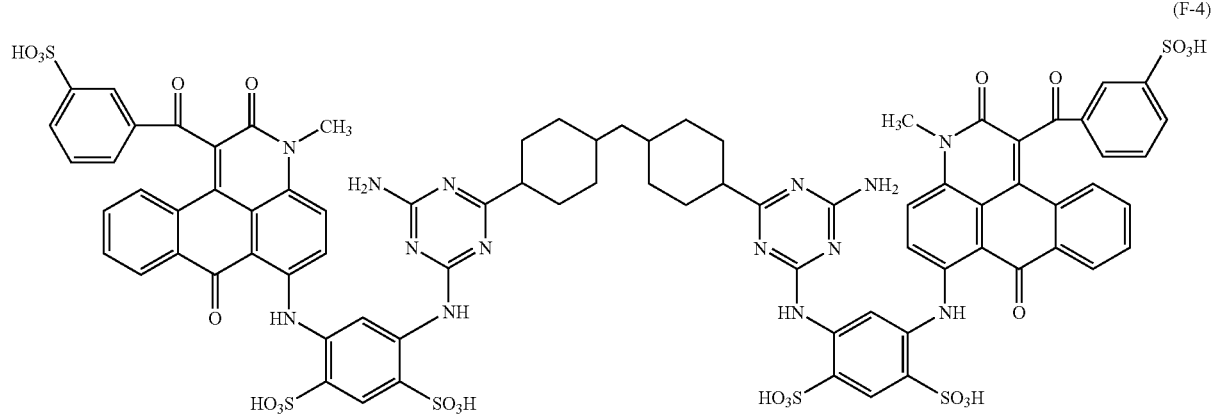

(F-4)

(Mixing Proportion)

The ink for ink jet recording of the invention preferably contains a dye in an amount of from not smaller than 0.2 to not greater than 10 parts by weight of the dye based on 100 parts by weight of the ink. The ink for ink jet recording of the invention may contain some dyes in combination. In the case where two or more dyes are used in combination, it is preferred that the total amount of these dyes fall within the above defined range.

(Physical Properties)

In the ink for ink jet recording of the invention, the dye preferably has either or both of the following physical properties 1 and 2:

Physical property 1: $|\lambda max\ (DMF) - \lambda max\ (water)| \geq 30\ nm$

[λmax (DMF) represents the maximum absorption wavelength in absorption spectrum measured in DMF (N,N-dimethylformamide); λmax (water) represents the maximum absorption wavelength in absorption spectrum measured in water]

Physical property 2: $\epsilon(DMF) \geq \epsilon(water)$

[ε (DMF) represents the molar absorption coefficient in DMF; ε (water) represents the molar absorption coefficient in water]

A dye having the physical properties 1 and 2 is considered to be associative.

(Formation of Full-color Image)

The ink for ink jet recording of the invention can be used to form not only a monochromatic image but also a full-color image. In order to form a full-color image, a magenta-toned ink, a cyan-toned ink and a yellow-toned ink may be used. In order to adjust color tone, a black-toned ink may be used. These inks may further comprise other coloring materials (dye or pigment) incorporated therein to enhance image reproducing properties.

(Yellow Dye)

As the yellow dye which can be used in the invention there may be used any yellow dye. Examples of yellow dyes include aryl or heterylazo dyes having heterocyclic rings such as phenol, naphthol, aniline, pyrazolone and pyridone or closed-chain type active methylene compounds as coupling components (hereinafter referred to as "coupler component"), azomethine dyes having closed-chain type active methylene compounds as coupler components, methine dyes such as benzylidene dyes and monomethine oxonol dyes, and quinone-based dyes such as naphthoquinone dye and anthraquinone dye. Other examples of yellow dyes include quinophthalone dye, nitro-nitroso dye, acridine dye, and acridinone dye.

(Magenta Dye)

As the magenta dye to be used herein there may be used any magenta dye. Examples of magenta dyes include aryl or heterylazo dyes having phenols, naphthols or anilines as coupler components, azomethine dyes having pyrazolones or pyrazolotriazoles as coupler components, methine dyestuffs such as arylidene dye, styryl dye, melocyanine dye and oxonol dye, carbonium dye such as diphenylmethane dye, triphenylmethane dye and xanthene dye, quinone-based dye such as naphthoquinone, anthraquinone and anthrapyridone, and condensed polycyclic dye such as dioxazine dye.

(Cyan Dye)

As the cyan dye to be used herein there may be used any cyan dye. Examples of cyan dyes include aryl or heteroazo dyes having phenols, naphthols or anilines as coupler components, azomethine dyes having heterocyclic rings such as phenol, naphthol and pyrrolotriazole as coupler components, polymethine dyes such as cyanine dye, oxonol dye and melocyanine dye, carbonium dyes such as diphenylmethane dye, triphenylmethane dye and xanthene dye, phthalocyanine dyes, anthraquinone dyes, and indigo-thioindigo dyes.

These dyes may assume yellow, magenta or cyan only when chromophore is partly dissociated, and, in this case, the counter cation may be an inorganic cation such as alkaline metal ion and ammonium ion or an organic cation such as pyridinium ion and quaternary ammonium salt ion or may be contained in a polymer cation as a partial structure.

As the black coloring material there may be used a carbon black dispersion besides disazo, trisazo and tetrazo dyes.

(Dispersion of Dye in Aqueous Medium)

In order to disperse the dye in the aqueous medium, a particulate colored material containing a dye and a lipophilic polymer is preferably dispersed in the aqueous medium as disclosed in JP-A-11-286637, JP-A-2001-240763, JP-A-2001-262039 and JP-A-2001-247788 or a dye dissolved in a high boiling organic solvent is preferably dispersed in the aqueous medium as disclosed in JP-A-2001-262018, JP-A-2001-240763, JP-A-2001-335734 and JP-A-2002-80772. For the details of method for dispersing the dye in the aqueous medium, the lipophilic polymer, high boiling organic solvent and additives to be used herein, and their amounts, reference can be made to the above cited patents. Alternatively, the aforementioned azo compound may be finely dispersed in the form of solid as it is. For dispersion, a dispersant and a surface active agent may be used. Examples of the dispersing device or method which can be used herein include simple stirrer, impellor stirring method, in-line stirring method, mill method (e.g., colloidal mill, ball mill, sand mill, attritor, roll mill, agitator mill), ultrasonic method, and high pressure emulsion dispersion method (high pressure homogenizer (Examples of commercially available high pressure homogenizer include Gaulin homogenizer, microfluidizer, and DeBEE2000)) may be used. For the details of method for preparing the aforementioned ink for ink jet recording, reference can also be made to JP-A-5-148436, JP-A-5-295312, JP-A-7-97541, JP-A-7-82515, JP-A-7-118584, JP-A-11-286637 and JP-A-2001-271003. These methods can be used also for the preparation of the ink for ink jet recording of the invention.

[Other Additives]

The ink for ink jet recording of the invention may comprises other additives incorporated therein so far as the effect of the invention cannot be impaired as necessary. Examples of these additives include known additives such as drying inhibitor (wetting agent), discoloration inhibitor, emulsion stabilizer, penetration accelerator, ultraviolet absorber, preservative, mildewproofing agent, pH adjustor, surface tension adjustor, antifoaming agent, viscosity adjustor, dispersant, dispersion stabilizer, rust inventive and chelating agent. These additives are incorporated directly in the aqueous ink solution. In the case where the lipophilic dye is used in the form of dispersion, it is normally added to a dye dispersion thus prepared. However, the lipophilic dye may be added to an aqueous phase during preparation.

(Drying Inhibitor)

The drying inhibitor is preferably used for the purpose of inhibiting clogging of the ink ejecting nozzle in the ink jet recording method due to drying of the ink for ink jet recording.

As the drying inhibitor to be used herein there is preferably used a water-soluble organic solvent having a lower vapor pressure than water. Specific examples of the water-soluble organic solvent include polyvalent alcohols such as ethylene glycol, propylene glycol, diethylene glycol, polyethylene glycol, thiodiglycol, dithiodigycol, 2-methyl-1,3-propanediol, 1,2,6-hexanetriol, acetylene glycol derivative, glycerin and trimethylolpropane, lower alkylethers of polyvalent alcohol such as ethylene glycol monomethyl(or ethyl)ether, diethylene glycol monomethyl(or ethyl)ether and triethylene glycol monoethyl(or butyl)ether, heterocyclic compounds such as 2-pyrrolidone, N-methyl-2-pyrrolidone, 1,3-dimethyl-2-imidazoli dinone and N-ethylmorpholine, sulfur-containing compounds such as sulfolane, dimethylsulfoxide and 3-sulfolene, polyfunctional compounds such as diacetone alcohol and diethanolamine, and urea derivatives. Preferred among these water-soluble organic solvents are polyvalent alcohols such as glycerin and diethylene glycol. These drying inhibitors may be used singly or in combination of two or more thereof These drying inhibitors are preferably incorporated in the ink in an amount of from 10% to 50% by weight.

(Penetration Accelerator)

The penetration accelerator is preferably used for the purpose of causing the ink for ink jet recording to penetrate into the paper more fairly. Examples of the penetration accelerator employable herein include alcohols such as ethanol, isopropanol, butanol, di(tri)ethylene glycol monobutyl ether and 1,2-hexanediol, sodium laurylsulfate, sodium oleate, and nonionic surface active agents. These penetration accelerators can exert a sufficient effect when incorporated in the ink in an amount of from 5% to 30% by weight. These penetration accelerators are preferably used in an amount such that neither print bleed-through nor print through occurs.

(Ultraviolet Absorber)

The ultraviolet absorber is used for the purpose of enhancing the preservability of image. Examples of the ultraviolet absorber include benzotriazole-based compounds as disclosed in JP-A-58-185677, JP-A-61-190537, JP-A-2-782, JP-A-5-197075 and P-A-9-34057, benzophenone-based compounds as disclosed in JP-A-46-2784, JP-A-5-194483 and U.S. Pat. No. 3,214,463, cinnamic acid-based compounds as disclosed in JP-B-48-30492, JP-A-56-21141 and JP-A-10-88106, triazine-based compounds as disclosed in JP-A-4-298503, JP-A-8-53427, JP-A-8-239368, JP-A-10-182621 and JP-T-8-501291, compounds as disclosed in Research Disclosure No. 24239, and compounds which absorb ultraviolet rays to emit fluorescence, i.e., so-called fluorescent brighteners, such as stilbene-based and benzoxazole-based compounds.

(Discoloration Inhibitor)

The discoloration inhibitor is used for the purpose of enhancing the preservability of image. As the discoloration inhibitor there may be used any of various organic and metal complex-based discoloration inhibitors. Examples of the organic discoloration inhibitors include hydroquinones, alkoxyphenols, dialkoxyphenols, phenols, anilines, amines, indanes, chromans, alkoxyanilines, and heterocyclic compounds. Examples of the metal complex-based discoloration inhibitors include nickel complex, and zinc complex. Specific examples of these oxidation inhibitors include compounds listed in the patents cited in Research Disclosure No. 17643, Article VII-I and J, Research Disclosure No. 15162, Research Disclosure No. 18716, left column, page 650, Research Disclosure No. 36544, page 527, Research Disclosure No. 307105, page 872, and Research Disclosure No. 15162, and compounds included in the formula and examples of representative compounds listed in JP-A-62-215272, pp. 127-137.

(Mildewproofing Agent)

Examples of the mildewproofing agent employable herein include sodium dehydroacetate, sodium benzoate, sodium pyridinethione-1-oxide, p-hydroxyabenzoic acid ethyl ester, 1,2-benzisothiazoline-3-one, and salts thereof. These mildewproofing agents are preferably incorporated in the ink in an amount of from 0.02% to 1.00% by weight.

(pH Adjustor)

As the pH adjustor there may be used the aforementioned neutralizing agent (organic base, inorganic alkali). For the purpose of enhancing the storage stability of the ink for ink jet recording, the pH adjustor is preferably added in such an amount that the pH value of the ink for ink jet recording reaches a range of from 6 to 10, more preferably from 7 to 10.

(Surface Tension Adjustor)

As the surface tension adjustor there may be used a nonionic, cationic or anionic surface active agent. The surface tension of the ink for ink jet recording of the invention is preferably from 25 to 70 mPa·s, more preferably from 25 to 60 mPa·s. The viscosity of the ink for ink jet recording of the invention is preferably adjusted to 30 mPa·s or less, more preferably 20 mPa·s or less. Examples of the anionic surface active agent include aliphatic acid salts, alkylsulfuric acid esters, alkylbenzenesulfonates, alkylnapthalenesulfonates, dialkylsulfosuccinates, alkylphosphoric acid esters, naphthalenesulfonic acid-formalin condensates, and polyoxyethylenealkyl sulfuric acid esters. Examples of the nonionic surface active agent include polyoxyethylenealkyl ethers, polyoxyethylene alkylallyl ethers, polyoxyethylene aliphatic acid esters, sorbitanaliphatic acid esters, polyoxyethylenesorbitanaliphatic acid esters, polyoxyethylenealkylamines, glycerinaliphatic acid esters, and oxyethyleneoxypropylene block copolymers. SURFYNOLS (produced by Air Products & Chemicals Inc.), which are acetylene-based polyoxyethylene oxide surface active agents, are preferably used as well. Further, amine oxide-based amphoteric surface active agents such as N,N-dimethyl-N-alkylamine oxide are preferred.

Moreover, those listed as surface active agents in JP-A-59-157,636, pp. 37-38, and Research Disclosure No. 308119, 1989, may be used.

(Antifoaming Agent)

As the antifoaming agent there may be used also a chelating agent such as fluorine-based compound, silicone-based compound and EDTA as necessary.

[Water-miscible Organic Solvent]

As the aqueous medium there may be used a mixture mainly composed of water, optionally with a water-miscible organic solvent. Examples of the water-miscible organic solvent employable herein include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyl diethanolamine, morpholine, N-ethylmorpholine, ethylene diamine, diethylene triamine, triethylene tetramine, polyethyleneimine, tetramethylpropylene diamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of the water-miscible organic solvents may be used in combination.

[Ink Jet Recording Method] (Image-receiving Material)

In accordance with the ink jet recording method of the invention, the ink for ink jet recording is energized to form an image on a known image-receiving material, i.e., ordinary paper, resin-coated paper such as paper dedicated for ink jet recording disclosed in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic paper, cloth, glass, metal, ceramics, etc.

[Recording Method]

In the present invention, the ink jet recording method is not limited. The ink of the invention may be used in any known recording method such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet method which comprises heating the ink to form bubbles that raise the pressure to eject the ink Examples of the ink jet recording method include a method which comprises ejecting many portions of an ink having a low concentration called photoink in a small volume, a method which comprises using a plurality of inks having substantially the same hue but different densities to improve the image quality, and a method involving the use of a colorless transparent ink.

(Combined Use of Polymer Latex Compound)

For the purpose of providing the image thus formed with gloss or water resistance or improving the weathering resistance of the image, a polymer latex compound may be additionally used. The time at which the latex compound is added to the image-receiving material may be before, during or after the addition of the coloring agent. Accordingly, the site at which the latex compound is incorporated in the image-receiving material may be the interior of the ink. Alternatively, the latex compound may be singly used in the form of liquid. In some detail, methods disclosed in JP-A-2002-166638, JP-A-2002-121440, JP-A-2002-154201, JP-A-2002-144696, JP-A-2002-80759, JP-A-2002-187342, and JP-A-2002-172774 may be preferably used.

[Recording Paper and Recording Film]

The recording paper and recording film to be used in ink jet printing with the ink of the invention in the invention will be described hereinafter.

[Support]

As the support in the recording paper or recording film there may be used one obtained by processing a chemical pulp such as LBKP and NBKP, a mechanical pulp such as GP, PGW, RMP, TMP, CTMP, CMP and CGP, used paper pulp such as DIP or the like, optionally mixed with known additives such as pigment, binder, sizing agent, fixing agent, cationic agent and paper strength improver, through various paper machines such as foundrinier paper machine and cylinder paper machine. As the support there may be used either a synthetic paper or plastic film sheet besides these support materials. The thickness of the support is preferably from 10 µm to 250 µm. The basis weight of the support is preferably from 10 to 250 g/m$^2$. An image-receiving layer and a back coat layer may be provided on the support directly or with a size press or anchor coat layer of starch, polyvinyl alcohol or the like interposed therebetween to prepare a material for receiving the ink of the invention. The support may be further subjected to leveling using a calendering machine such as machine calender, TG calender and soft calender. In the invention, as the support there is preferably used a paper or plastic film laminated with a polyolefin (e.g., polyethylene, polystyrene, polybutene, copolymer thereof) or polyethylene terephthalate on both sides thereof. The polyolefin preferably comprises a white pigment (e.g., titanium oxide, zinc oxide) or a tinting dye (e.g., cobalt blue, ultramarine, neodymium oxide) incorporated therein.

[Ink-receptive Layer] (Pigment)

The image-receiving layer to be provided on the support comprises a pigment or an aqueous binder incorporated therein. As such a pigment there is preferably used a white pigment. Examples of the white pigment employable herein include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfate and zinc carbonate, and organic pigments such as styrene-based pigment, acrylic pigment, urea resin and melamine resin. Particularly preferred among these white pigments to be incorporated in the ink-receptive layer are porous inorganic white pigments. In particular, synthetic amorphous silica having a large pore area, etc. are preferred. As the synthetic amorphous silica there may be also used anhydrous silicate obtained by dry method or hydrous silicate obtained by wet method. Particularly preferred among these synthetic amorphous silica is hydrous silicate.

(Aqueous Binder)

Examples of the aqueous binder to be incorporated in the ink-receptive layer include water-soluble polymers such as polyvinyl alcohol, silanol-modified polyvinyl alcohol, starch, cationated starch, casein, gelatin, carboxymethyl cellulose, hydroxyethyl cellulose, polyvinyl pyrrolidone, polyalkylene oxide and polyalkylene oxide derivative, and water-dispersible polymers such as styrene butadiene latex and acryl emulsion. These aqueous binders may be used singly or in combination of two or more thereof In the invention, particularly preferred among these aqueous binders are polyvinyl alcohol and silanol-modified polyvinyl alcohol from the standpoint of adhesion to pigment and exfoliation resistance of ink-receiving layer.

The ink-receptive layer may comprise a mordant, a waterproofing agent, a light-resistance improver, a surface active agent, and other additives incorporated therein besides the pigments and aqueous binders.

(Mordant)

The mordant to be incorporated in the ink-receptive layer is preferably passivated. To this end, a polymer mordant is preferably used.

For the details of the polymer mordant, reference can be made to JP-A-48-28325, JP-A-5474430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing a polymer mordant disclosed in JP-A-1-161236, pp. 212 to 215. The use of the polymer mordant disclosed in the above cited patent makes it possible to obtain an image having an excellent quality and hence improve the light-resistance of the image.

(Waterproofing Agent)

The waterproofing agent can be used to render the image waterproof. As such a waterproofing agent there is preferably used a cationic resin in particular. Examples of such a cationic resin include polyamide polyamine epichlorohydrin, polyethylenimine, polyamine sulfone, dimethyl diallyl ammonium chloride polymer, cation polyacrylamide, and colloidal silica. Particularly preferred among these cationic resins is polyamide polyamine epichlorohydrin. The content of such a cation resin is preferably from 1% to 15% by weight, particularly from 3% to 10% by weight based on the total solid content of the ink-receiving layer.

(Light-resistance Improver)

Examples of the light-resistance improver include zinc sulfate, zinc oxide, hindered amine-based oxidation inhibitor, and benzophenone-based and benzotrizole-based ultraviolet absorbers. Particularly preferred among these light-resistance improvers is zinc sulfate.

(Surface Active Agent, Other Additives)

The surface active agent acts as a coating aid, releasability improver, slipperiness improver or antistat. For the details of the surface active agent, reference can be made to JP-A-62-173463 and JP-A-62-183457. An organic fluoro-compound may be used instead of the surface active agent. The organic fluoro-compound is preferably hydrophobic. Examples of the organic fluoro-compound include fluorine-based surface active agents, oil-based fluorine compounds (e.g., fluorine-based oil), and solid fluorine-based compound resins (e.g., tetrafluoroethylene resin). For the details of the organic fluoro-compound, reference can be made to JP-B-57-9053 (8th to 17th columns), JP-A-61-20994, and JP-A-62-135826. Other examples of additives to be incorporated in the ink-receptive layer include pigment dispersants, thickening agents, antifoaming agents, dyes, fluorescent brighteners, preservatives, pH adjustors, matting agents, and film hardeners. There may be provided one or two ink-receptive layers.

[Backcoat Layer] (White Pigment)

The recording paper and recording film may comprise a back coat layer provided thereon. Examples of the components which can be incorporated in the back coat layer include white pigments, aqueous binders, and other components. Examples of the white pigments to be incorporated in the back coat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, hydrated halloysite, magnesium carbonate and magnesium hydroxide, and organic pigments such as styrene-based plastic pigment, acrylic plastic pigment, polyethylene, microcapsule, urea resin and melamine resin.

(Aqueous Binder, Other Additives)

Examples of the aqueous binder to be incorporated in the back coat layer include water-soluble polymers such as styrene/maleate copolymer, styrene/acrylate copolymer, polyvinyl alcohol, silanol-modified polyvinyl alcohol, starch, cationated starch, casein, gelatin, carboxymethyl cellulose, hydroxyethyl cellulose and polyvinylpyrrolidone, and water-dispersible polymers such as styrenebutadiene latex and acryl emulsion. Examples of other components to be incorporated in the back coat layer include antifoaming agents, foaming inhibitors, dyes, fluorescent brightening agents, preservatives, and waterproofing agents.

[Incorporation of Polymer Latex]

The layers (including back layer) constituting the ink jet recording paper and film may comprise a fine dispersion of polymer incorporated therein. The fine dispersion of polymer is used for the purpose of improving physical properties of film, e.g., stabilizing dimension, inhibiting curling, adhesion and film cracking. For the details of the fine dispersion of polymer, reference can be made to JP-A-62-245258, JP-A-62-1316648, and JP-A-62-110066. The incorporation of a fine dispersion of polymer having a glass transition temperature as low as not higher than 40° C. in a layer containing a mordant makes it possible to prevent the cracking or curling of the layer. The incorporation of a fine dispersion of polymer having a high glass transition temperature, too, in the back layer makes it possible to prevent the curling of the back layer.

EXAMPLE

The invention will be further described in the following examples, but the invention is not limited thereto.

Example 1

Preparation of Black Ink

To the following components was added deionized water. The solution was then adjusted with a 10 mol/l LiOH solution to make pH 8.5 and 11. The solution was then heated to a temperature of from 30° C. to 40° C. with stirring for 1 hour. Thereafter, the solution was filtered through a microfilter having an average pore diameter of 0.25 μm under reduced pressure to prepare 1l of a black ink solution 1. Formulation of black ink solution 1:

| | |
|---|---|
| Dye 1 | 60 g |
| Dye 2 | 15 g |
| Print density improver (A-1) | 20 g |
| Triethylene glycol | 30 g |
| Glycerin | 100 g |
| Triethylene glycol monobutyl ether | 100 g |
| Triethanolamine | 10 g |
| Surfinol 465 | 10 g |
| PROXEL XL2 | 1.8 g |

Dye 1

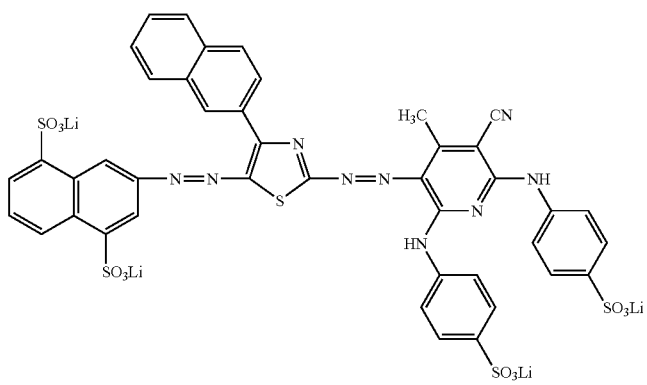

Dye 2

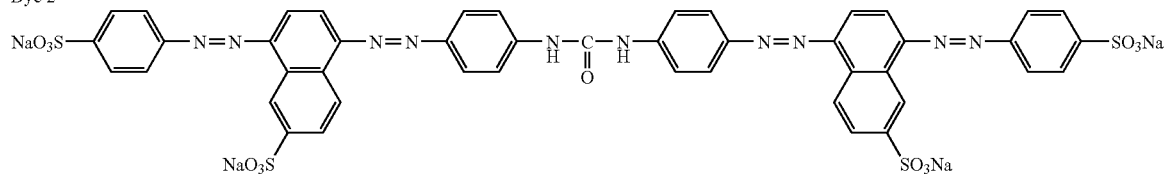

Formulation of Black Ink Solutions 2 to 7:

Black ink solutions 2 to 7 were prepared in the same manner as the black ink solution 1 except that as the print density improvers there were used those set forth in Table 1 below instead of A-1.

These print density improvers, if any, were each used in amounts equimolecular with the print density improver per mol of ink solution 1.

For comparison, the black ink solution 8 was free of print density improver, the black ink solution 9 comprised maleic acid incorporated therein, and the black ink solution 10 comprised maleic acid and triethanolamine maleate incorporated therein at a ratio of 1:3 as disclosed in JP-A-2003-147245.

These black inks were each then packed in the black ink cartridge of a Type PM-980C ink jet printer (produced by SEIKO EPSON CORPORATION. For other color inks, authentic inks for PM-980C were used. Under these conditions, these inks were ejected to form a black monochromatic image having a gradation of 11 steps. The image was printed on a Type KA450PM photomat paper (produced by SEIKO EPSON CORPORATION) as an image-receiving sheet. The image thus formed was then evaluated for print density and fastness.

(Evaluating Method)
1) For the measurement of print density, a monochromatic image having a gradation of 11 steps which had been printed on a Type KA450PM photomat paper (produced by SEIKO EPSON CORPORATION) in a 30° C.–80% RH atmosphere was examined for density using a Type 310TR reflection densitometer (produced by X-Rite Inc.). The measurements of images having the highest print density were then compared.
2) For the evaluation of image fastness, a black image printed on a Type KA450PM photomat paper (produced by SEIKO EPSON CORPORATION) having a reflection density of from 0.9 to 1.1 was sampled.

(i) Light-fastness

For the evaluation of light-fastness, the density Ci of an image printed on the sample was immediately measured using a Type X-rite 310TR reflection densitometer. The sample was then irradiated with xenon ray (85 klux) from a weatherometer produced by Atlas Electric Devices, Inc.) for 10 days. The sample thus irradiated was then measured for image density Cf to determine the percent remaining of dye (Cf/Ci×100) which was then used for evaluation. For the evaluation of percent remaining of dye, the reflection density was evaluated on three points of reflection density, i.e., 1, 1.5 and 2. Those showing a percent dye remaining of not smaller than 70% at any density were ranked A. Those showing a percent magenta dye remaining of less than 70% at two density points were ranked B. Those showing a percent magenta dye remaining of less than 70% at all densities were ranked C.

(ii) Heat Fastness

For the evaluation of heat fastness, the sample was aged at a temperature of 80° C. and 15% RH for 10 days. The sample was measured for density using the aforementioned Type X-Rite 310TR reflection densitometer before and after aging to determine the percent dye remaining which was then evaluated. The percent dye remaining was then evaluated at three reflection density points, i.e., 1, 1.5 and 2. Those showing a percent dye remaining of not smaller than 90% at any density were ranked A. Those showing a percent dye remaining of less than 90% at two density points were ranked B. Those showing a percent magenta dye remaining of less than 90% at all densities were ranked C.

(iii) Ozone Resistance

For the evaluation of ozone gas resistance, the medium on which an image had been formed was allowed to stand in a box the ozone gas concentration of which had been adjusted to 0.5 ppm for 7 days. The sample was measured for image density using a Type X-Rite 310TR reflection densitometer before and after aging to determine the percent dye remaining which was then evaluated. The reflection density was measured at three yellow density points, i.e., 1, 1.5 and 2. The ozone gas concentration in the box was adjusted by the use of a Type OZG-EM-01 ozone gas monitor (produced by APPLICS CO., LTD.).

The evaluation of percent dye remaining was made according to a three-step criterion. Those showing a percent dye remaining of not smaller than 80% at any density were ranked A. Those showing a percent dye remaining of less than 80% at at least one density point were ranked B. Those showing a percent dye remaining of less than 70% at all densities were ranked C.

TABLE 1

| Ink solution | Print density improver | Print density | Light-fastness | Heat fastness | Ozone resistance | Remarks |
|---|---|---|---|---|---|---|
| 1 | A-1 | 1.73 | A | A | A | Inventive |
| 2 | A-2 | 1.74 | A | A | A | Inventive |

TABLE 1-continued

| Ink solution | Print density improver | Print density | Light-fastness | Heat fastness | Ozone resistance | Remarks |
|---|---|---|---|---|---|---|
| 3 | A-3 | 1.71 | A | A | A | Inventive |
| 4 | A-4 | 1.73 | A | A | A | Inventive |
| 5 | A-5 | 1.73 | A | A | A | Inventive |
| 6 | B-1 | 1.70 | A | A | A | Inventive |
| 7 | B-5 | 1.71 | A | A | A | Inventive |
| 8 | None | 1.60 | A | A | A | Comparative |
| 9 | Maleic acid | 1.60 | A | A | A | Comparative |
| 10 | Maleic acid:triethanol amine maleate = 1:3 | 1.60 | A | A | A | Comparative |

As can be seen in the results set forth in Table 1 above, when the black ink of the invention comprising a compound which is a print density improver is used, the resulting image exhibits an enhanced print density which is superior to that of the comparative examples.

It can be also confirmed that also when a print density improver is used in combination with the dyes for the yellow, magenta and cyan inks, the similar effect can be exerted.

In accordance with the ink for ink jet recording comprising a print density improver of the invention and the ink jet recording method using same, an image having a high print density and a high fastness to light and an active gas in the atmosphere, particularly ozone gas can be formed.

The entire disclosure of each and every foreign patent application from which the benefit of foreign priority has been claimed in the present application is incorporated herein by reference, as if fully set forth.

What is claimed is:

1. An aqueous ink for ink jet recording, which comprises:
   at least one dye; and
   at least one of a compound having at least one phosphonic acid group and at least one carboxyl group and a compound having at least two phosphonic acid groups as a print density improver(s),
   wherein the at least one of a compound having at least one phosphonic acid group and at least one carboxyl group and a compound having at least two phosphonic acid groups is a compound represented by formula (1):

$$Y_m\text{-}Z\text{-}(PO_3X_2)_n \quad (1)$$

wherein Z represents a connecting group which may be substituted;
   Y represents $-CO_2X$, $-SO_3X$ or other anionic hydrophilic substituent;
   X represents lithium;
   m represents an integer of 0 or more; and
   n represents an integer of 1 or more when m is 1 or more and Y contains $-SO_3X$, and n represents an integer of 2 or more when m is 0 or when m is 1 or more but Y is free of $-SO_3X$, with the proviso that when there are a plurality of Y's, they may be the same or different.

2. The ink for ink jet recording according to claim 1, wherein the at least one dye comprises at least one selected from the group consisting of phthalocyanine dye, monoazo dye, disazo dye, trisazo dye and tetrakisazo dye.

3. The ink for ink jet recording according to claim 2, wherein the disazo dye is represented by formula (2):

wherein A, B and C each independently represents an aromatic or heterocyclic group which may be substituted, with the proviso that A and C each represents a monovalent group and B represents a divalent group.

4. The ink for ink jet recording according to claim 3, wherein the disazo dye is represented by formula (3):

Formula (3)

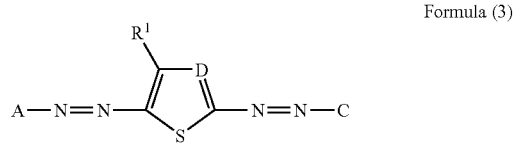

wherein A and C each independently represents an aromatic or heterocyclic group which may be substituted;
$R^1$ represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be further substituted; and
D represents a nitrogen atom or $-C(CN)=$.

5. The ink for ink jet recording according to claim 4, wherein the disazo dye is represented by formula (4):

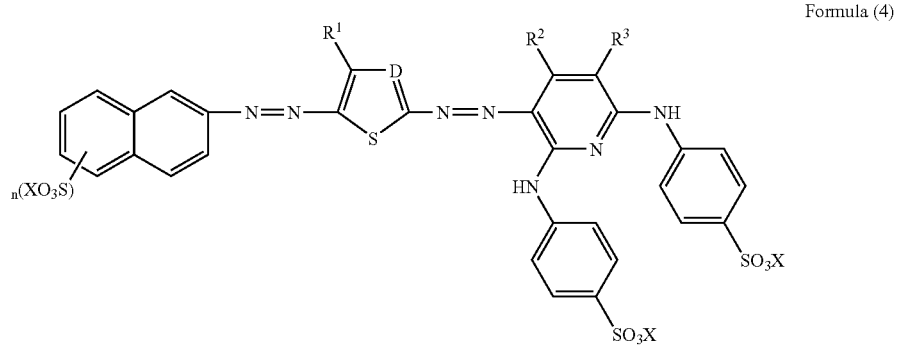

Formula (4)

wherein $R^1$, $R^2$ and $R^3$ each independently represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group which may be further substituted;

D represents a nitrogen atom or —C(CN)=;

X represents a hydrogen atom, alkaline metal, alkaline earth metal or substituted or unsubstituted ammonium cation; and n represents an integer of from 0 to 3.

6. The ink for ink jet recording according to claim 2, wherein the phthalocyanine dye is represented by formula (5):

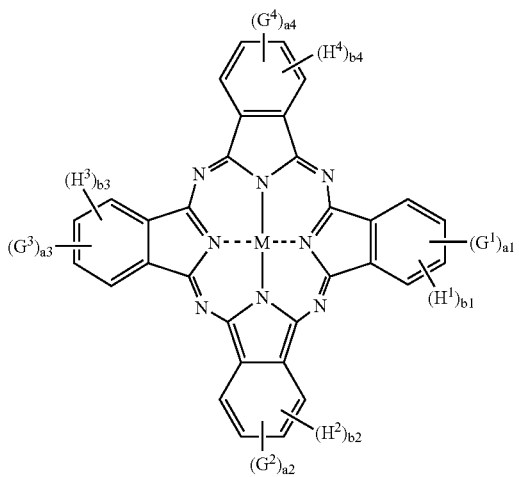

Formula (5)

wherein $G^1$, $G^2$, $G^3$ and $G^4$ each independently represents a —SO—$R^{10}$, —$SO_2$—$R^{10}$, —$SO_2NR^{11}R^{12}$, sulfo group, —$CONR^{11}R^{12}$ or —$CO_2R^{11}$ in which $R^{10}$ represents a substituted or unsubstituted alkyl, cycloalkyl, alkenyl, aralkyl, aryl or heterocyclic group, and $R^{11}$ and $R^{12}$ each independently represents a hydrogen atom or substituted or unsubstituted alkyl, cycloalkyl, alkenyl, aralkyl, aryl or heterocyclic group, with the proviso that there are a plurality of $R^{10}$'s, they may be the same or different;

$H^1$, $H^2$, $H^3$ and $H^4$ each independently represents a monovalent substituent;

$a_1$ to $a_4$ and $b_1$ to $b_4$ each independently represents the number of substituents $G^1$ to $G^4$ and $H^1$ to $H^4$, respectively;

$a_1$ to $a_4$ each independently represents an integer of from 0 to 4, with the proviso that $a_1$ to $a_4$ are not 0 at the same time;

$b_1$ to $b_4$ each independently represents an integer of from 0 to 4, with the proviso that when $a_1$ to $a_4$ and $b_1$ to $b_4$ each represents an integer of 2 or more, the plurality of $G^1$'s to $G^4$'s and $H^1$'s to $H^4$'s may be the same or different; and M represents a hydrogen atom, metal atom or oxide, hydroxide or halide thereof.

7. The ink for ink jet recording according to claim 1, wherein the at least one dye has either or both of physical properties 1 and 2:

Physical property 1: |λmax (DMF)–λmax (water)| ≧ 30 nm

Physical property 2: ε (DMF) ≧ ε (water)

wherein λmax (DMF) represents a maximum absorption wavelength in absorption spectrum measured in DMF;

λmax (water) represents a maximum absorption wavelength in absorption spectrum measured in water;

ε (DMF) represents a molar absorption coefficient in DMF; and

ε (water) represents a molar absorption coefficient in water.

8. A print density improver for an ink for ink jet recording, which comprises at least one of a compound having at least one phosphonic acid group and at least one carboxyl group and a compound having at least two phosphonic acid groups, wherein the at least one of a compound having at least one phosphonic acid group and at least one carboxyl group and the compound having at least two phosphonic acid groups is a compound represented by formula (1):

  (1)

wherein Z represents a connecting group which may be substituted;

Y represents —CO$_2$X, —SO$_3$X or other anionic hydrophilic substituent;

X represents lithium;

m represents an integer of 0 or more; and n represents an integer of 1 or more when m is 1 or more and Y contains —SO$_3$X, and n represents an integer of 2 or more when m is 0 or when m is 1 or more but Y is free of —SO$_3$X, with the proviso that when there are a plurality of Y's, they may be the same or different.

9. A method for improving print density in ink jet recording, which comprises utilizing a print density improver according to claim 8.

* * * * *